US012753810B2

(12) United States Patent
Shula

(10) Patent No.: US 12,753,810 B2
(45) Date of Patent: Oct. 6, 2026

(54) TORQUE PAD

(71) Applicant: Honeywell International Inc., Charlotte, NC (US)

(72) Inventor: Brian Shula, South Bend, IN (US)

(73) Assignee: Honeywell International Inc., Charlotte, NC (US)

( * ) Notice: Subject to any disclaimer, the term of this patent is extended or adjusted under 35 U.S.C. 154(b) by 509 days.

(21) Appl. No.: 18/298,837

(22) Filed: Apr. 11, 2023

(65) Prior Publication Data

US 2024/0344571 A1 Oct. 17, 2024

(51) Int. Cl.

| | |
|---|---|
| ***F16D 55/36*** | (2006.01) |
| ***F16D 65/097*** | (2006.01) |
| *B64C 25/42* | (2006.01) |

(52) U.S. Cl.

CPC ........... *F16D 55/36* (2013.01); *F16D 65/097* (2013.01); *B64C 25/42* (2013.01)

(58) Field of Classification Search

CPC .. F16D 55/36; F16D 65/12; F16D 2055/0008; F16D 2055/0054; F16D 13/52; F16D 2125/36; F16D 65/122; F16D 2127/10; F16D 3/06; F16D 27/115; F16D 43/216; F16D 65/097; F16D 65/58; B64C 25/42

See application file for complete search history.

(56) References Cited

U.S. PATENT DOCUMENTS

| | | | | |
|---|---|---|---|---|
| 2,635,714 A * | 4/1953 | Henry | F16D 13/52 188/240 |
| 5,321,876 A * | 6/1994 | Massing | F16D 55/40 29/401.1 |

(Continued)

FOREIGN PATENT DOCUMENTS

| | | |
|---|---|---|
| CN | 106499752 B | 8/2019 |
| DE | 102007023191 A1 | 12/2008 |
| KR | 101900388 B1 | 9/2018 |

OTHER PUBLICATIONS

Extended Search Report from counterpart European Application No. 24168075.0 dated Oct. 17, 2024, 10 pp.
Communication pursuant to Article 94(3) EPC from counterpart European Application No. 24168075.0 dated Apr. 29, 2025, 4 pp.
Response to Extended Search Report dated Oct. 17, 2024, from counterpart European Application No. 24168075.0 filed Dec. 5, 2024, 54 pp.

(Continued)

*Primary Examiner* — Robert A. Siconolfi
*Assistant Examiner* — Mahbubur Rashid
(74) *Attorney, Agent, or Firm* — Shumaker & Sieffert, P.A.

(57) ABSTRACT

In some examples, a brake assembly is configured to compress a brake disc stack to reduce and/or limit rotational motion of a wheel about a wheel axis. The brake assembly is configured to transmit a compression force on the disc stack to a backing plate. The backing plate is configured to transmit the compression force to a pad face of a torque pad, which transmits the compression force to a torque tube. A pad face of the torque pad defines a convex surface configured to cause a magnitude of a force profile on the pad face to decrease as the force profile distributes toward an edge of the torque pad. In examples, the pad face defines a first convex surface configured to reduce the magnitude as the force profile distributes toward a first end and a second convex surface configured to reduce the magnitude as the force profile distributes toward a second end substantially opposite the first end.

18 Claims, 8 Drawing Sheets

(56) References Cited

U.S. PATENT DOCUMENTS

| | | | | | |
|---|---|---|---|---|---|
| 5,551,534 | A * | 9/1996 | Smithberger | F16D 55/36 | 188/71.7 |
| 5,588,507 | A * | 12/1996 | Beardsley | F16D 65/127 | 188/72.5 |
| 5,926,932 | A * | 7/1999 | Niespodziany | F16D 55/36 | 188/18 R |
| 5,992,577 | A * | 11/1999 | Souetre | F16D 55/36 | 188/196 R |
| 6,340,075 | B1 * | 1/2002 | Bok | F16D 55/36 | 188/71.7 |
| 6,532,637 | B1 * | 3/2003 | Niespodziany | F16D 55/40 | 188/71.6 |
| 6,581,730 | B1 * | 6/2003 | Haydon | B64F 5/10 | 188/18 A |
| 6,752,248 | B2 * | 6/2004 | Berwanger | F16D 55/36 | 188/73.31 |
| 8,127,899 | B2 * | 3/2012 | Cress | F16D 55/38 | 188/73.1 |
| 8,616,344 | B2 * | 12/2013 | Baden | F16D 55/40 | 188/71.5 |
| 8,752,679 | B2 | 6/2014 | Arbesman et al. | | |
| 10,094,439 | B2 | 10/2018 | Charles et al. | | |
| 10,228,030 | B2 * | 3/2019 | Kendricks | F16D 65/122 | |
| 10,677,278 | B2 * | 6/2020 | Houser | F16D 65/186 | |
| 10,871,196 | B2 | 12/2020 | Cooley | | |
| 11,585,387 | B2 | 2/2023 | Fish | | |
| 11,585,397 | B2 | 2/2023 | Shula et al. | | |
| 2008/0142314 | A1 * | 6/2008 | Scelsi | F16D 65/00 | 188/73.1 |
| 2009/0159379 | A1 * | 6/2009 | Monopoli | F16D 65/566 | 188/196 BA |
| 2015/0267763 | A1 | 9/2015 | Lou et al. | | |

OTHER PUBLICATIONS

Response to Communication pursuant to Article 94(3) EPC dated Apr. 29, 2025, from counterpart European Application No. 24168075.0 filed Aug. 11, 2025, 10 pp.

Notice of Intent to Grant and Text Intended to Grant from counterpart European Application No. 24168075.0 dated Oct. 22, 2025, 104 pp.

* cited by examiner

TORQUE PAD

TECHNICAL FIELD

The present disclosure relates to a brake assembly of a vehicle.

BACKGROUND

Vehicles, such as aircrafts, may use a wheel brake assembly that includes a multi-disc brake assembly. For example, the multi-disc brake assembly may include a disc stack comprising plurality of rotor discs engaged with a wheel and a plurality of stator discs interleaved with the rotor discs. The rotor discs and wheel are configured to rotate around an axle, while the stator discs remain stationary. To decelerate rotational motion of a rotating wheel, the brake assembly may displace pistons against a pressure plate to compress the rotating rotor discs engaged with the wheel against the stationary stator discs, therefore producing torque that decelerates the rotational motion of the wheel. In some examples, the rotor discs may be engaged with the wheel via rotor drive keys positioned on an interior surface of the wheel. In some examples, stator discs may be engaged with a stationary torque tube surrounding the axle via splines positioned on the torque tube. In some such examples, the brake assembly may be configured to compress the rotor discs and the stator discs between the piston and a backing plate supported by the torque tube.

SUMMARY

The present disclosure describes example brake assemblies utilized to reduce and/or substantially prevent a rotation of a wheel. The brake assembly is configured to compress a brake disc stack to reduce and/or limit rotational motion of the wheel about the wheel axis. The brake assembly is configured to transmit a compression force on the disc stack to a backing plate. The backing plate is configured to transmit the compression force to a torque tube via one or more torque pads of the brake assembly. The brake assembly is configured to support at least one torque pad using a boss (e.g., a protrusion) of the brake assembly, such as a boss defined by the torque tube. The torque pad may be configured to limit and/or otherwise reduce bending stresses on one or more regions of the torque pad when the backing plate transmits the compression force via the torque pad. For example, the torque pad may be configured to limit peak bending stresses in a portion of the torque pad defining a loading surface.

The torque pad includes a pad face configured to engage the backing plate when the backing plate transmits the compression force to the torque pad. The pad face defines a loading surface configured to receive at least some portion of the compression force imparted by the backing plate. The pad face is configured to substantially concentrate receipt of the compression force on the loading surface. For example, the pad face may be configured such that the pad face develops a force distribution defining one or more force profiles across the loading surface when the loading surface receives the compression force. The pad face may be configured such that a force profile decreases in magnitude as the force profile distributes in a direction from the loading surface to an edge of the torque pad. The pad face defines one or more convex surfaces extending from the loading surface to an edge of the torque pad to, for example, cause the decrease in the force profile as the force profile distributes in the direction from the loading surface to the edge, such that bending stresses in load portion of the torque pad are limited and/or otherwise reduced when the backing plate transmits compression force to the torque pad.

In some examples, a torque pad comprises: a pad body defining a front portion and a back portion opposite the front portion, the front portion defining a pad face having a loading surface configured to engage a backing plate of a brake assembly, and the back portion configured to couple to a boss of the brake assembly, wherein the pad body defines a pad axis intersecting the loading surface and the boss when the back portion couples to the boss, wherein the pad face defines a convex surface extending from the loading surface toward an edge of the pad body, wherein the edge is one of a first edge of the pad body or a second edge of the pad body, and wherein the pad face extends from the first edge to the second edge and the pad axis extends between the first edge and the second edge.

In some examples, a torque pad comprises: a pad body defining a front portion and a back portion opposite the front portion, the front portion defining a pad face having a loading surface configured to engage a backing plate of a brake assembly, and the back portion configured to couple to a boss of the brake assembly, wherein the pad body defines a pad axis intersecting the loading surface and the boss when the back portion couples to the boss, wherein the pad face defines a first convex surface extending from the loading surface to a first edge of the pad body and a second convex surface extending from the loading surface to a second edge of the pad body, the pad face extending from the first edge to the second edge, wherein the loading surface separates the first convex surface and the second convex surface, and wherein the first convex surface curves away from the loading surface in a direction toward the back portion and the second convex surface curves away from the loading surface in the direction toward the back portion.

In some examples, a method comprises: engaging, by a loading surface of a pad face defined by a front portion of a pad body, a backing plate of a brake assembly, wherein the pad body defines a pad axis intersecting the loading surface and the pad face defines a convex surface extending from the loading surface to an edge of the pad body, wherein the edge is one of a first edge of the pad body or a second edge of the pad body, and wherein the pad face extends from the first edge to the second edge and the pad axis extends between the first edge and the second edge; and coupling, using a back portion of the pad body opposite the front portion, the pad body to a boss of the brake assembly such that the pad axis intersects the boss.

The details of one or more examples are set forth in the accompanying drawings and the description below. Other features, objects, and advantages will be apparent from the description and drawings, and from the claims.

DETAILED DESCRIPTION

Figure 1:
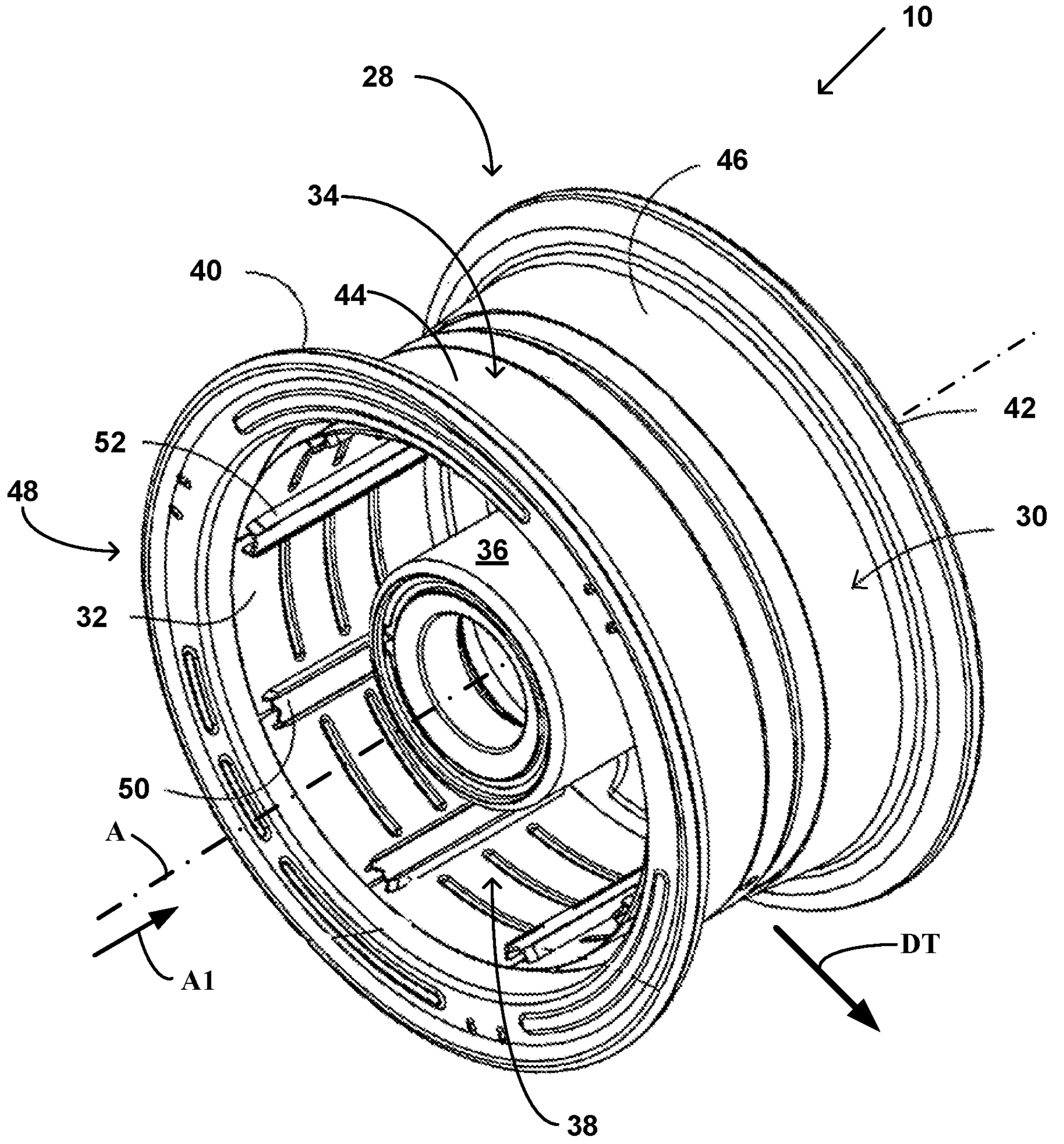
FIG. 1 is a perspective view illustrating an example wheel including a plurality of rotor drive keys on an interior surface of the wheel.

The disclosure describes articles, systems, and techniques relating to an assembly comprising a wheel and a brake assembly, and, in particular, an assembly including a torque pad supported by a torque tube of the brake assembly. The wheel is configured to rotate around a wheel axis. The brake assembly includes a disc stack which includes one or more rotor discs and one or more stator discs. For example, the disc stack may include a plurality of rotor discs interleaved with a plurality of stator discs. The rotor discs are rotationally coupled with the wheel, such that a rotation of the wheel around the wheel axis causes rotation of the rotor discs around the wheel axis. The stator discs are configured to remain substantially stationary relative to the wheel and the rotor discs. The brake assembly is configured to compress the disc stack to cause engagement of friction surfaces on the rotating rotor discs and the stationary stator discs, reducing a rotational speed of the rotor discs around the wheel axis. The rotor discs are configured to engage the wheel, such that the reduction in the rotational speed of the rotor discs causes a reduction in the speed of the wheel. The brake assembly is configured to compress the disc stack against a backing plate supported by a torque tube.

In examples, the brake assembly is configured to compress the disc stack (e.g., using an actuator) between a pressure plate and a backing plate to cause engagement of friction surfaces within the disc stack. The brake assembly includes a torque pad configured to couple the backing plate and the torque tube. The brake assembly may be configured such that, when the actuator exerts a compression force to compress the disc stack against the backing plate (e.g., to slow the wheel), the backing plate transmits at least some portion of the compression force via the torque pad to the supporting torque tube. In examples, the torque pad includes a pad body defining a pad face configured to receive the compression force from the backing plate and transmit the compression force to the torque tube via a back portion engaged with the torque tube. In examples, the back portion defines a back face configured to transmit the compression force to the torque tube.

The brake assembly is configured to support the torque pad using a boss (e.g., a protrusion) of the brake assembly. In examples, the boss is a torque tube boss defined by the torque tube. The boss may be configured to limit movement of the torque pad in an axial direction of the wheel, a radial direction of the wheel, and/or a tangential direction of the wheel. In examples, the back portion of the torque pad defines an attachment structure configured to couple (e.g., mechanically engage) the torque pad and the boss, such that the boss limits movement of the torque pad (e.g., movement relative to the boss). For example, the attachment structure may a portion of the pad body defining a hole configured to receive a cotter pin, bolt, and/or other fastener, a pin structure configured to insert into a support recess of the boss, and/or another type of attachment structure sufficient to allow and/or cause coupling of the boss and the torque pad.

The torque pad (e.g., the pad body) includes a front portion substantially opposite the back portion. The torque pad is configured to receive the compression force from the backing plate via the front portion. The pad body is configured to transmit the force from the front portion to the back portion. The back portion (e.g., the back face) may be configured to transmit the compression force to the boss supporting the torque pad. The torque pad is configured to limit and/or otherwise reduce bending stresses on at least a load portion of the torque pad when the backing plate transmits the compression force to the front portion. The reduction of the bending stresses in response to a compression force imparted by a backing plate may allow a more elongated torque pad to be employed in a brake assembly. The more elongated torque pad may provide additional area for the transmission of torque (e.g., torque around an axial direction of the brake assembly) from the backing plate to the torque pad when the torque pad inserts within a backing plate pocket of the backing plate. In some examples, the reduction of the bending stresses and a corresponding reduction in reaction forces from the torque pad to the backing plate may reduce stress concentrations in the backing plate (e.g., within carbon material comprising the backing plate), potentially enhancing an operational life of the backing plate. Bending stress reduction may allow for lower cost materials (e.g., when the torque pad experiences high temperatures). Higher stresses might otherwise allow the pad to permanently deform under certain operating conditions. In examples, the torque pad may comprise, for example, precipitation-hardened 17-4 stainless steel and/or nickel-based MAR-M-247.

The front portion defines a pad face configured to engage the backing plate when the backing plate transmits the compression force to the torque pad. The pad face defines a loading surface configured to receive the compression force imparted by the backing plate. For example, the loading surface may be some portion of the pad face. In examples, the loading surface is a portion of the pad face displaced from one or more edges of the pad body. The pad face is configured to substantially concentrate receipt of the compression force on the loading surface to, for example, reduce and/or otherwise limit bending stresses in a load portion of the torque pad extending to and/or including the edge.

In examples, the pad body is configured to transmit the compression force imparted by the backing plate from the front portion (e.g., the pad face) to the back portion (e.g., the back face) in the direction of a pad axis defined by the pad body. The pad body may be configured such that the pad axis intersects the pad face and the back face. In examples, the pad body is configured such that the pad axis intersects the loading surface and the boss when the boss supports the torque pad. The torque pad may be configured such that a force profile developed across the loading surface in response to impartation of the compression force substantially decreases in magnitude as the force profile distributes in a direction from the pad axis to the edge of the torque pad. In examples, the pad body is configured such that a magnitude of the force profile decreases such that the edge region defining and/or including the edge experiences substantially zero contact force with the backing plate when the backing plate imparts the compression force to the loading surface.

The pad face is configured to define one or more convex surfaces extending from the loading surface to an edge of the torque pad to, for example, cause the decrease in the force profile as the force profile distributes toward the edge. In examples, the torque pad defines at least a first edge and a second edge. The pad axis may extend between the first edge and the second edge. The pad face may extend substantially from the first edge to the second edge such that, for example, the first edge and the second edge define some portion of a perimeter surrounding the pad face ("pad face perimeter"). In examples, the second edge is substantially opposite the first edge. For example, the torque pad may be configured such that the loading surface is substantially between the first edge and the second edge. In some examples, the first edge is displaced from the pad axis in a first radial direction and the second edge is displaced from the pad axis in a second radial direction opposite the first radial direction.

In examples, the convex surface substantially extends from the loading surface of the pad face to the edge of the torque pad. The torque pad may be configured such that the convex surface substantially curves away in a direction away from the loading surface and toward the back portion of the torque pad. For example, the convex surface may define a surface profile (e.g., in a plane perpendicular to the pad axis and/or parallel to a plane defined by an axial direction and a tangential direction of the brake assembly) which extends from a point of commencement on the pad face to the edge. The surface profile may have a positive curvature with respect to a vector normal to (e.g., perpendicular to) and extending away from the surface profile. In examples, the surface profile defines one or more curved intervals, curvilinear intervals, and/or linear intervals over the surface profile. For example, the surface profile may define one or more substantially elliptical, oval shaped, or other curved intervals. In some examples, the convex surface is substantially "flatter" than the curvature of a corner-round which might be configured to transition from the pad face to the edge. For example, one or more intervals of the surface profile may define a radius of curvature greater than a radius of curvature defined by a circular arc (e.g., a quarter-round arc) extending from the point of commencement to the first edge.

In examples, the torque pad may be configured to limit and/or reduce bending stresses on a load portion of the torque pad. The torque pad may be configured to cause a reduction in a magnitude as the force profile distributes from the pad axis to one or both of the first edge and the second edge. For example, the torque pad may define the convex surface such that the convex surface extends from the loading surface to the first edge. The torque pad may define a second convex surface extending from the loading surface to the second edge. The convex surface and the second convex surface may extend from substantially opposite sides of a loading surface boundary surrounding the loading surface, such that the loading surface substantially separates the convex surface and the second convex surface.

In examples, the torque pad includes a third edge and a fourth edge configured to extend over some portion of (e.g., substantially all of) a displacement from the first edge to the second edge. In examples, the pad axis extends between the third edge and the fourth edge. The pad face may extend substantially from the third edge to the fourth edge such that, for example, the third edge and the fourth edge define some portion of the pad face perimeter surrounding the pad face.

In examples, the third edge and/or the fourth edge defines an edge surface configured to receive a tangential force from the backing plate in a direction substantially perpendicular to the direction of the compression force received by the loading surface. For example, the backing plate may impart the tangential force to the edge surface as a result of a torque transmitted to the backing plate from one or brake discs of the brake assembly. In examples, the edge surface is configured to engage a boundary ("pocket boundary") defining a backing plate pocket in which the torque pad is inserted. The edge surface may be configured to receive the tangential force imparted by the backing plate via the pocket boundary. The reduction of the bending stresses within regions of the torque pad including the first edge and/or the second edge may allow the third edge and/or fourth edge to define greater displacements as compared to torque pads with more minimal or no reductions in the bending stresses. The increased displacements of the third edge and/or fourth edge may provide additional area and/or support to the torque pad and/or a backing plate when the torque pad receives the tangential force from the backing plate. In examples, the reduction in the bending stress allows an increased displacement between a first edge and a second edge of the torque pad. This may allow an increased bearing area defined by a third edge and/or a fourth edge of the torque pad, to for example, improve a response of the torque pad to tangential loading (e.g., loading in a tangential direction of the brake assembly).

Hence, the torque pad may be configured to limit and/or otherwise reduce bending stresses on a load portion of the torque pad when a backing plate transmits a compression force to the torque pad and the torque pad transmits the force to a boss of a brake assembly. The torque pad (e.g., the pad face) defines one or more convex surfaces extending to an edge of the torque pad to, for example, cause the decrease in a force profile as the force profile distributes from a loading surface of the pad face toward the edge. The one or more convex surfaces may allow a more elongated torque pad to be employed in a brake assembly to, for example, provide additional area and/or support to the torque pad and/or a backing plate when the torque pad receives a tangential force from the backing plate. In examples, the reduction of the bending stresses may reduce stress concentrations in the backing plate, potentially enhancing an operational life of the backing plate.

Figure 2:
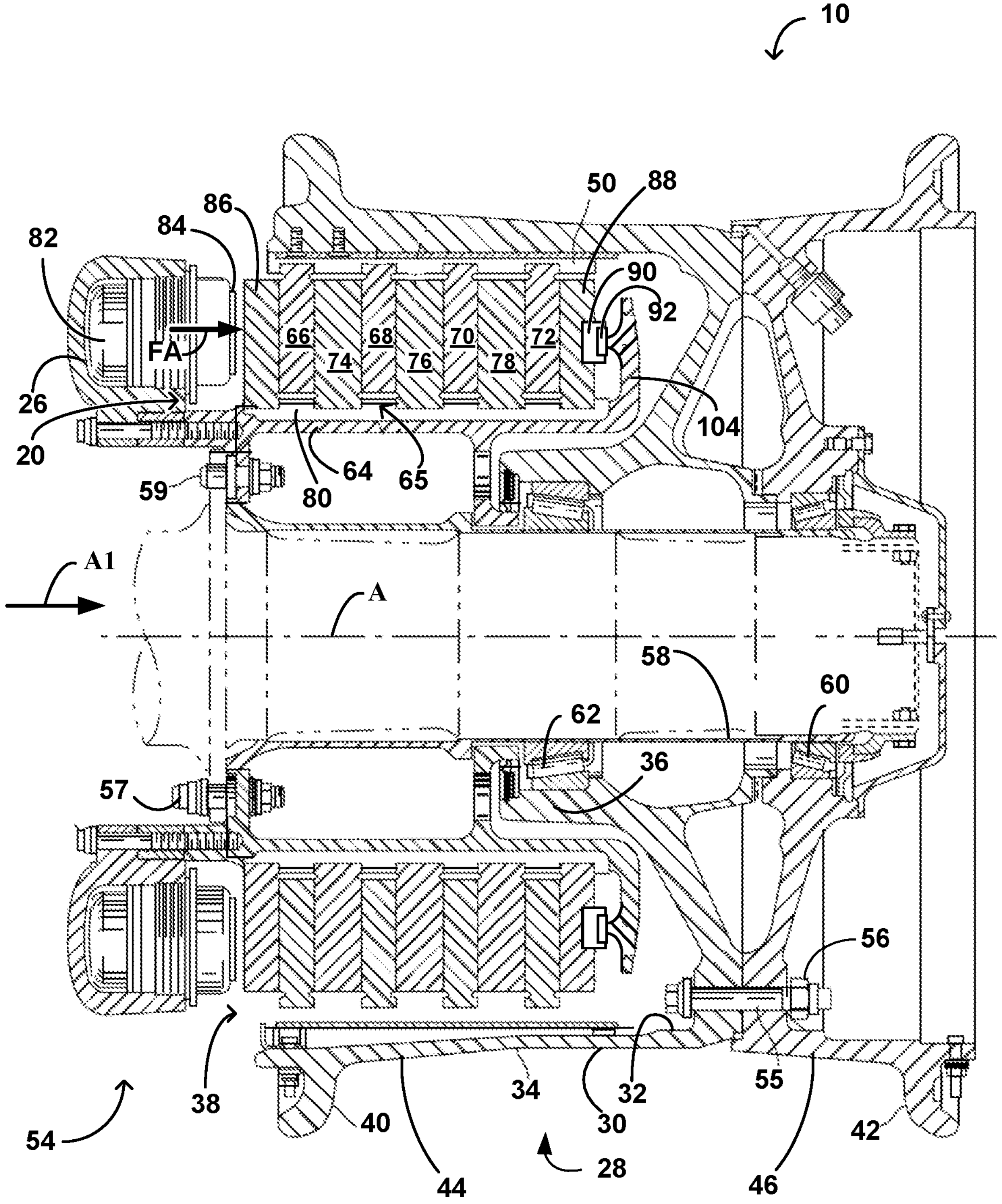
FIG. 2 is a schematic cross-sectional view illustrating an example wheel and brake assembly including the wheel of FIG. 1.

FIG. 1 is a perspective view illustrating an example wheel 10 configured to rotate around an axis of rotation A. In examples, wheel 10 is a part of an aircraft vehicle. In other examples, wheel 10 may be a part of any other vehicle, such as, for example, any land vehicle or other vehicle. FIG. 2 is a schematic cross-sectional view illustrating wheel 10 and an example brake assembly 54 configured to decelerate a rotation of wheel 10 using an actuator 82 to compress a disc stack 65 (e.g., between a pressure plate 86 and a backing plate 88). The cross-section of FIG. 2 is illustrated with a cutting plane perpendicular to the axis of rotation A.

In the example shown in FIG. 1, wheel 10 includes a wheel rim 28 defining an exterior surface 30 and interior surface 32. Wheel rim 28 includes tubewell 34 and wheel hub 36. Interior surface 32 and wheel hub 36 may define a wheel cavity 38 (e.g., a volume) between interior surface 32 and wheel hub 36. In some examples, a tire (not shown) may be mounted on exterior surface 30 of wheel rim 28. Wheel 10 may include an inboard bead seat 40 and an outboard bead seat 42 configured to retain a tire on exterior surface 30 of wheel rim 28. In examples, wheel 10 may comprise an inboard section 44 (e.g., including inboard bead seat 40) and an outboard section 46 (e.g., including outboard bead seat 42). Wheel 10 (and/or brake assembly 54 (FIG. 2)) may define an axial direction A1 parallel to the axis of rotation A. Wheel 10 may be configured to travel in a direction substantially perpendicular to the axial direction A1 when wheel 10 rotates around axis of rotation A.

Wheel 10 includes a plurality of rotor drive keys 48 on interior surface 32 of wheel 10, such as rotor drive key 50 and rotor drive key 52. In some examples, each rotor drive key of the plurality of rotor drive keys 48 extends in a substantially axial direction of wheel 10 (e.g., in a direction parallel to the axis of rotation A). The plurality of rotor drive keys 48 ("rotor drive keys 48") and interior surface 32 are configured to be substantially stationary with respect to each other, such that when wheel 10 (and interior surface 32) rotates around axis of rotation A, each of the rotor drive keys (e.g., rotor drive keys 50, 52) translates over a closed path around axis A. Consequently, when wheel 10, interior surface 32, and rotor drive keys 48 are rotating around axis of rotation A, a force on one or more of rotor drive keys 48 opposing the direction of rotation acts to slow or cease the rotation. As will be discussed, rotor drive keys 48 may be configured to receive a torque from a brake assembly (e.g., brake assembly 54 (FIG. 2)) configured to reduce and/or cease a rotation of wheel 10. Rotor drive keys 48 may be integrally formed with interior surface 32, or may be separate from and mechanically affixed to interior surface 32.

FIG. 2 is a schematic cross-sectional view illustrating wheel 10 with a brake assembly 54 positioned at least partially within wheel cavity 38. FIG. 2 illustrates wheel rim 28 as a split rim wheel with lug bolt 55 and lug nut 56 connecting inboard section 44 and outboard section 46; however, wheel rim 28 may utilize other configurations (e.g., a unified wheel rim) in other examples. An axial assembly 58 is configured to support wheel 10 while allowing wheel 10 to rotate around axis A using bearing 60 and bearing 62. For example, bearings 60, 62 may define a substantially circular track around axial assembly 58. In examples, axis A extends through axial assembly 58. A torque tube 64 is coupled to axial assembly 58, such that torque tube 64 remains substantially rotationally stationary when wheel 10 rotates around axial assembly 58 and axis A. Torque tube 64 may at least partially surround an exterior of axial assembly 58. Axial assembly 58 may be mechanically coupled to a strut or some other portion of a vehicle using, for example, bolts 57 and/or bolts 59, or some other fastening device. Wheel 10 is shown and described to provide context to the brake assembly described herein; however, the brake assembly described herein may be used with any suitable wheel assembly in other examples.

In the example shown in FIG. 2, brake assembly 54 is positioned within wheel 10 (e.g., wheel cavity 38) and configured to engage torque tube 64 and rotor drive key 50. Brake assembly 54 is configured to generate a torque to oppose a rotation of wheel 10 around axis A and transfer the torque to rotor drive key 50, reducing and/or eliminating the rotation of wheel 10 around axis A. Brake assembly 54 includes disc stack 65 which includes one or more rotor discs (e.g., rotor discs 66, 68, 70, 72) and one or more stator discs (e.g., stator discs 74, 76, 78). Rotor discs 66, 68, 70, 72, and/or stator discs 74, 76, 78 may have any suitable configuration. For example, rotor discs 66, 68, 70, 72 and/or stator discs 74, 76, 78 can each be substantially annular discs surrounding axial assembly 58. Stator discs 74, 76, 78 are coupled to torque tube 64 via a spline 80 and remain rotationally stationary with torque tube 64 (and axial assembly 58) as wheel 10 rotates. Rotor discs 66, 68, 70, 72 are rotationally coupled to rotor drive key 50 and interior surface 32 and rotate substantially synchronously with wheel 10 around axis A.

Brake assembly 54 includes an actuator 82 configured to compress disc stack 65 to bring friction surfaces of rotor discs 66, 68, 70, 72 into contact with friction surfaces of stator discs 74, 76, 78 to generate shearing forces between the discs. The shearing forces cause rotor discs 66, 68, 70, 72 to exert a torque on rotor drive key 50 opposing a rotation of wheel 10. In examples, actuator 82 is configured to cause a piston 84 to translate (e.g., translate substantially parallel to axis A) to compress disc stack 65. Actuator 82 may cause piston 84 to translate using any suitable process. In some examples, actuator 82 is configured to cause translation of piston 84 by supplying and/or venting a pressurized hydraulic fluid to or from a piston chamber. In addition or instead, in some examples, actuator 82 is configured to cause piston 84 to translate through a motion (e.g., a rotary motion) generated by an electric motor.

In examples, actuator 82 is configured to compress disc stack 65 using a pressure plate 86 and/or backing plate 88. For examples, actuator 82 may be configured to exert an actuator force FA (e.g., using piston 84) to cause compression of disc stack 65 substantially between pressure plate 86 and backing plate 88. In examples, backing plate 88 may be supported by torque tube 64. For example, backing plate 88 may be configured to be substantially stationary with respect to torque tube 64. Wheel 10 may rotate around backing plate 88 when wheel 10 rotates around torque tube 64. Brake assembly 54 may be configured such that the actuator force FA exerted on disc stack 65 by actuator 82 causes disc stack 65 to translate toward backing plate 88. For example, the actuator force FA may cause rotor discs 66, 68,70, 72 to translate over rotor drive key 50 toward backing plate 88 and cause stator discs 74, 76, 78 to translate over spline 80 toward backing plate 88.

Backing plate 88 is configured to resist the translation of disc stack 65 and exert a reaction force on disc stack 65 opposite the actuator force FA exerted by actuator 82, such that disc stack 65 is compressed by actuator 82 between pressure plate 86 and backing plate 88. When torque tube 64 supports backing plate 88, backing plate 88 may transfer a compression force to torque tube 64 in response to the actuator force FA. For example, the compression force may be a force having a directionality substantially similar to actuator force FA and a having a magnitude dependent on actuator force FA.

Brake assembly 54 includes a torque pad 90 configured to transfer the compression force from backing plate 88 to torque tube 64. Torque pad 90 is supported by a boss 92 of brake assembly 54. In examples, boss 92 is a torque tube boss supported and/or defined by torque tube 64. Brake assembly 54 may be configured such that backing plate 88 transmits the compression force to torque pad 90, and torque pad 90 transmits the compression force via boss 92 to torque tube 64. In examples, torque pad 90 is configured to insert into a pocket (e.g., backing plate pocket 124 (FIG. 4)) of backing plate 88 when boss 92 supports torque pad 90.

Thus, brake assembly 54 may be utilized to reduce and/or eliminate the rotation of wheel 10 using a compression force by actuator 82 exerted on disc stack 65. Backing plate 88 may be configured to react against the compression force, causing a compression of disc stack 65. Torque tube 64 may be configured to support backing plate 88, such that torque tube 64 experiences a force (e.g., substantially parallel to axis A) when actuator 82 exerts the compression force on disc stack 65.

Wheel 10 may be used with any variety of private, commercial, or military aircraft or other type of vehicle. Wheel 10 may be mounted to a vehicle via, for example, axial assembly 58. Axial assembly 58 may be mounted on a strut of a landing gear (not shown) or other suitable component of a vehicle to connect wheel 10 to the vehicle. Wheel 10 may rotate around axis A and axial assembly 58 to impart motion to the vehicle. Wheel 10 is shown and described to provide context to the brake assembly described herein; however, the brake assembly described herein may be used with any suitable wheel assembly in other examples.

Figure 3:
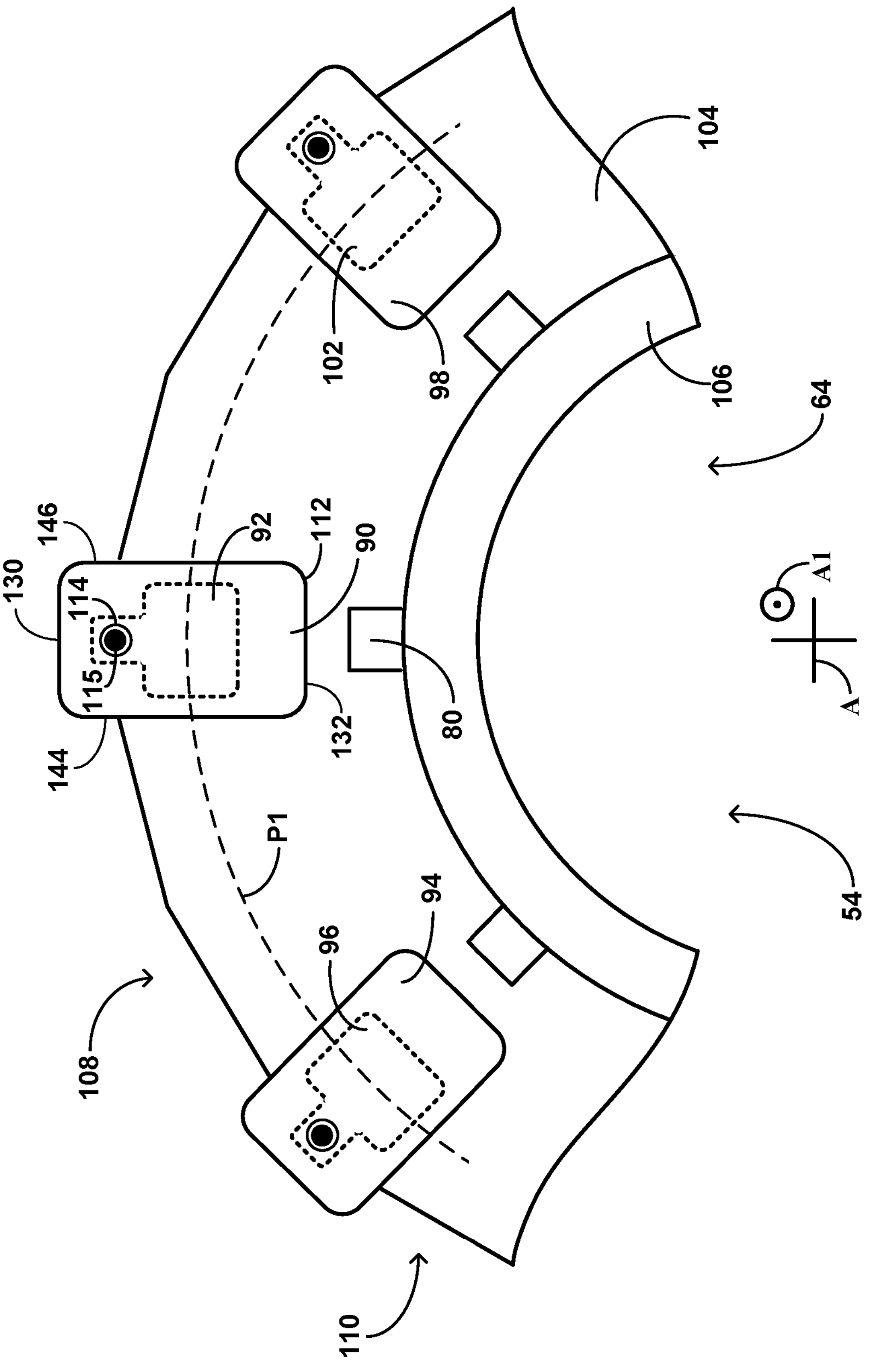
FIG. 3 is a schematic plan view illustrating portions of a brake assembly and a plurality of torque pads viewed from a direction opposite an axial direction of the brake assembly.

FIG. 3 illustrates a schematic view of brake assembly 54 viewed in the direction of the axial direction A1. In FIG. 3, the axial direction A1 is parallel to axis of rotation A and depicted proceeding out of the page. FIG. 3 depicts torque tube 64 and a plurality of torque pads including torque pad 90 supported by boss 92, second torque pad 94 supported by second boss 96, and third torque pad 98 supported by third boss 102. In FIG. 3, boss 92 is hidden by torque pad 90, second boss 96 is hidden behind second torque pad 94, and third boss 102 is hidden behind third torque pad 98, and each are illustrated with dashed lines. In examples, torque tube 64 includes a flange 104 ("torque tube flange 104") supporting boss 92, second boss 96, and/or third boss 102 ("bosses 92, 96, 102"). In examples, torque tube flange 104 extends outward from a body 106 of torque tube 64 ("torque tube body 106"). In some examples, torque tube flange 104 defines bosses 92, 96, 102. Torque tube body 106 may define a substantially annular body surrounding axis of rotation A. Torque tube flange 104 may extend radially outward (relative to axis of rotation A) from torque tube body 106.

Brake assembly 54 may include a plurality of torque pads 108 ("torque pads 108") which include, for example, torque pads 90, 94, 98. Torque pads 108 may include any number of torque pads, including more or less torque pads than those represented by torque pads 90, 94, 98. In examples, brake assembly 54 is configured such that torque pads 108 are substantially arranged around a perimeter P1 surrounding the axial direction A1. One or more of (e.g., each of) torque pads 108 may be configured to transmit a compression force from backing plate 88 to at least one of bosses 92, 96, 102. In examples, brake assembly 54 includes a plurality of bosses 110 ("bosses 110") which include, for example, bosses 92, 96, 102. Bosses 110 may include any number of bosses, including more or less bosses than those represented by bosses 92, 96, 102. In examples, brake assembly 54 is configured such that bosses 92, 96, 102 are substantially arranged around the perimeter P1. One or more of (e.g., each of) bosses 92, 96, 102 may be configured to transmit a compression force from at least one of torque pads 90, 94, 98 to torque tube 64 (e.g., torque tube flange 104). Torque tube flange 104 may be configured to transmit the compression force to torque tube body 106. Torque pads 108 may be configured to couple (e.g., mechanically couple) to bosses 110. For example, torque pad 90 may be configured to couple to boss 92 using attachment structure 114 and/or fastener 115. Torque pad 90 may couple to boss 92 in other ways in other examples.

Figure 4:
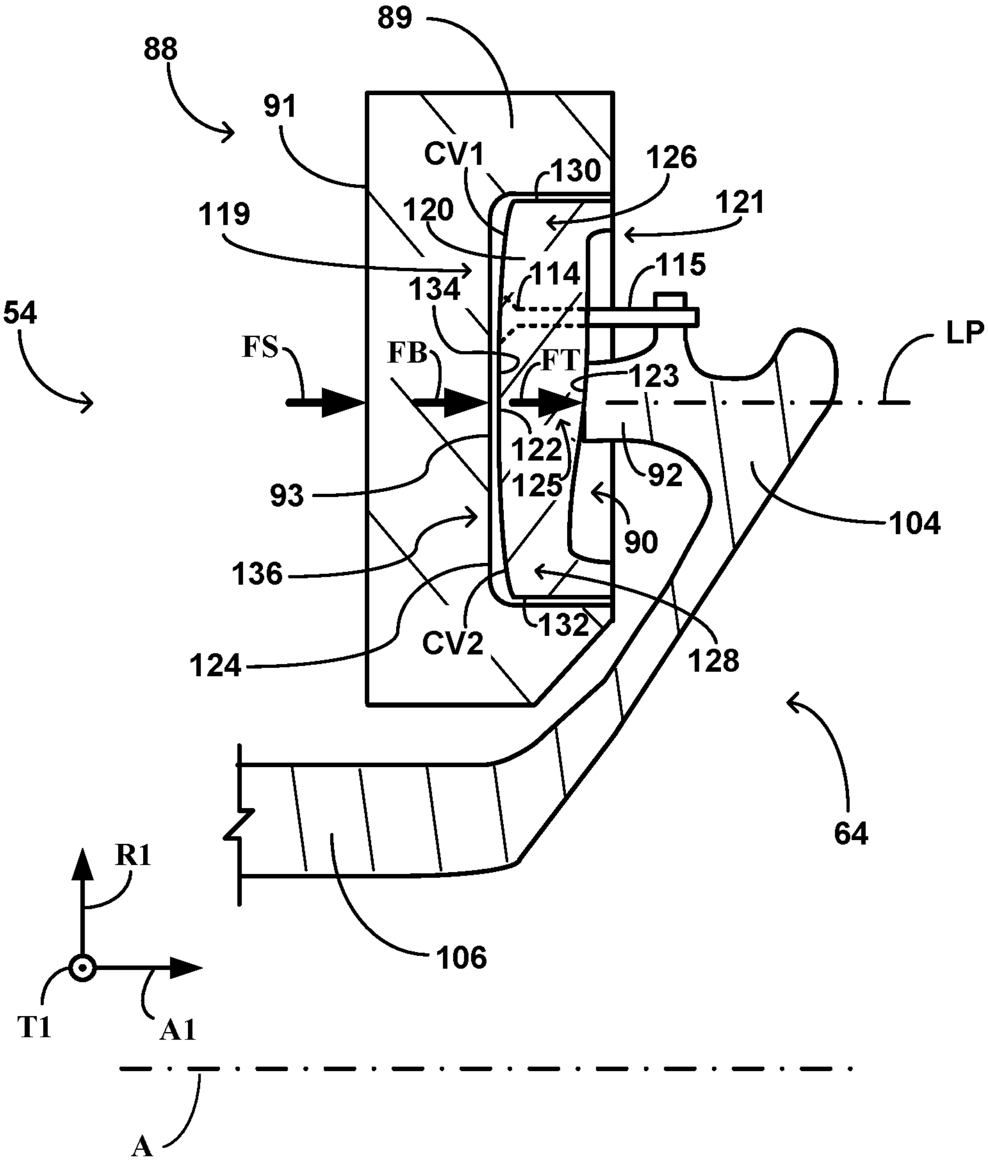
FIG. 4 is a schematic cross-sectional view of a torque pad supported by a torque tube, with the cutting plane taken parallel to the axial direction and a radial direction of the brake assembly.

FIG. 4 illustrates a schematic cross-sectional view of a section of torque tube 64 supporting torque pad 90, with a cutting plane intersecting the axial direction A1 and passing through boss 92 and torque pad 90. In FIG. 4, the axial direction A1 is parallel with axis of rotation A (FIG. 1). Torque pad 90 is configured such that boss 92 acts to limit movement of torque pad 90 (e.g., movement relative to torque tube 64) in the axial direction A1, a radial direction R1 perpendicular to the direction A1, or a tangential direction T1 perpendicular to the direction A1 and the direction R1 when torque pad 90 is coupled to boss 92. In FIG. 4 and elsewhere, the axial direction A1, the radial direction R1, and the tangential direction T1 define a right-handed coordinate system which satisfies the right hand rule.

Backing plate 88 is configured to exert a force FB on torque pad 90 in response to the exertion of a force FS on backing plate 88 from brake assembly 54. In examples, force FS is at least some component of actuator force FA (FIG. 2) exerted on disc stack 65 by actuator 82. Backing plate 88 includes a body 89 ("backing plate body 89") defining a front face 91 ("backing plate front face 91") and a back face 93 ("backing plate back face 93") substantially opposite backing plate front face 91. Backing plate body 89 is configured to transmit force FS imparted on backing plate front face 91 to backing plate back face 93 to cause backing plate back face 93 to exert force FB on torque pad 90. In examples, backing plate 88 is configured such that backing plate back face 93 is displaced from backing plate front face 91 in the axial direction A1 when backing plate 88 engages torque pad 90.

Force FS may be one or more force vectors imparted on backing plate front face 91, a force distribution imparted over an area of backing plate front face 91, a force profile (e.g., a section of a force distribution in the A1-R1 plane) imparted over a portion of backing plate front face 91, or some other type of force or combination of forces imparted to backing plate front face 91. In examples, force FS is a first force profile or first force distribution which may define (e.g., may be expressed as) a first force resultant having a direction which passes through a centroid of the first force profile or first force distribution.

Force FB may be one or more force vectors imparted on torque pad 90, a force distribution imparted over an area of torque pad 90, a force profile (e.g., a section of a force distribution in the A1-R1 plane) imparted over a portion of torque pad 90, or some other type of force or combination of forces imparted from backing plate back face 93 to torque pad 90. In examples, force FB is at least some component of force FS and/or actuator force FA. In examples, force FS is a second force profile or second force distribution which may define (e.g., may be expressed as) a second force resultant having a direction which passes through a centroid of the second force profile or second force distribution.

Torque pad 90 is configured to exert a force FT on boss 92 in response to the exertion of force FB when boss 92 supports torque pad 90. In examples, torque pad 90 includes a body 120 ("pad body 120") including a front portion 119 ("pad front portion 119") and a back portion 121 ("pad back portion 121"). Torque pad 90 is configured such that pad front portion 119 receives force FB from backing plate 88 when boss 92 supports torque pad 90. Pad body 120 is configured to transmit the force FB from pad front portion 119 to pad back portion 121. In examples, pad back portion 121 is configured to transmit force FT to boss 92. In examples, front portion 119 and back portion 121 may be separated substantially by, for example, a plane D-D' (FIG. 7) parallel to and/or defined by the R1-T1 axes and extending through pad body 120. In examples, force FT is at least some component of force FB, force FS, and/or actuator force FA.

Force FT may be one or more force vectors imparted from torque pad 90 (e.g., pad back portion 121) to boss 92, a force distribution imparted from an area of torque pad 90, a force profile (e.g., a section of a force distribution in the A1-R1 plane) imparted from torque pad 90, a resultant force of the force distribution imparted from the area of torque pad 90, or some other type of force or combination of forces imparted from torque pad 90 to boss 92. In examples, force FT is a third force profile or third force distribution which may define (e.g., may be expressed as) a third force resultant having a direction which passes through a centroid of the third force profile or third force distribution.

Pad body 120 (e.g., pad front portion 119) defines a pad face 122 configured to engage backing plate 88 when backing plate 88 exerts force FB on torque pad 90. Torque pad 90 may be configured to receive force FB substantially via pad face 122. In examples, pad body 120 (e.g., pad back portion 121) defines a back face 123 configured to exert force FT on boss 92 when boss 92 supports torque pad 90 and torque pad 90 experiences force FB (e.g., from backing plate 88). Pad body 120 may be configured to receive force FB via pad face 122 and transmit at least some portion of force FB to back face 123 such that, for example, back face 123 imparts force FT to boss 92. In examples, pad body 120 is configured such that back face 123 faces in a direction substantially opposite that of pad face 122. For example, pad body 120 may be configured such that, when boss 92 supports torque pad 90, back face 123 faces substantially in the axial direction A1 as pad face 122 faces substantially in a direction opposite the axial direction A1. In examples, back face 123 is configured to engage boss 92 at least when backing plate 88 transmits force FB to torque pad 90 and/or torque pad 90 transmits force FT to boss 92.

Pad body 120 defines a pad axis LP intersecting pad face 122 and back face 123. Torque pad 90 may be configured such that pad axis LP intersects boss 92 when boss 92 supports torque pad 90. In examples, torque pad 90 is configured such that pad axis LP is substantially parallel to the axial direction A1 when boss 92 supports torque pad 90. In some examples, torque pad 90 is configured to transmit force FT to boss 92 in a direction substantially parallel to pad axis LP. For example, torque pad 90 may be configured to transmit one or more force vectors to boss 92 in a direction substantially parallel to pad axis LP when torque pad 90 transmits force FT to boss 92. In some examples, torque pad 90 is configured to adjust and or move relative to boss 92 to cause back face 123 to transmit force FT to boss 92 in a direction substantially parallel to pad axis LP. In examples, back face 123 defines a convex surface (e.g., convex surface CV5 (FIG. 7)) configured to allow torque pad 90 to adjust and or move relative to boss 92.

Boss 92 is configured to receive force FT from torque pad 90 (e.g., back face 123) and transmit force FT to a portion of torque tube 64 (e.g., torque tube flange 104 and/or torque tube body 106). In some examples, such as illustrated at FIG. 4, boss 92 is a torque tube boss defined by torque tube 64 (e.g., torque tube flange 104), such that boss 92 forms a substantially unitary component with torque tube 64 (e.g., with torque tube flange 104). In examples, actuator force FA, force FS, force FB, and/or force FT include one or more vector components substantially parallel to axis A. Each of torque pads 108 may be configured to receive a force such as force FB from backing plate 88.

In examples, backing plate 88 (e.g., backing plate body 89) defines a backing plate pocket 124 configured to receive torque pad 90 (e.g., when boss 92 is coupled to torque pad 90). In examples, backing plate pocket 124 is a recess of backing plate 88. Backing plate pocket 124 may be cavity defining a volume extending into backing plate body 89 in a direction substantially opposite the axial direction A1. Backing plate pocket 124, torque pad 90, and/or boss 92 may be configured such that torque pad 90 and/or boss 92 at least partially insert within the volume defined by backing plate pocket 124 when torque pad 90 is coupled to boss 92 and torque pad 90 (e.g., pad face 122) engages backing plate front face 91. In examples, backet plate pocket 124 is configured to at least partially and/or substantially entirely surround an outer perimeter defined by torque pad 90. In examples, the outer perimeter of torque pad 90 surrounds pad axis LP defined by torque pad 90. In some examples, torque pad 90 is configured such that the outer perimeter of torque pad 90 substantially conforms to backing plate pocket 124 when torque pad 90 (e.g., pad face 122) engages backing plate front face 91.

In examples, backing plate 88 defines a plurality of backing plate pockets, with each backing plate pocket in the plurality configured to receive one of torque pads 108 (FIG. 3) when bosses 110 support torque pads 108. For example, backing plate 88 may define backing plate pocket 124 configured to receive torque pad 90, a second backing plate pocket configured to receive second torque pad 94, and/or a third backing plate pocket configured to receive third torque pad 98. In examples, backing plate pockets 112 are configured such that each of torque pads 108 reside within backing plate pockets 112 substantially concurrently. For example, backing plate pockets 112 may be configured such that torque pad 90 resides within backing plate pocket 124 when second torque pad 94 resides within the second backing plate pocket and third torque pad 98 resides within the third backing plate pocket.

Torque pad 90 may be configured to limit and/or otherwise reduce bending stresses on one or more regions of torque pad 90 when backing plate 88 (e.g., backing plate pocket 124) transmits force FB to torque pad 90. For example, pad body 120 may define a load portion 125 configured to receive at least some portion of force FB and exert at least some portion of force FT on boss 92. In examples, load portion 125 is configured to receive a majority of force FB (e.g., substantially all) and exert a majority of force FT (e.g., substantially all) on boss 92. Torque pad 90 may be configured such that pad axis LP extends through load portion 125. In examples, load portion 125 defines pad face 122. Torque pad 90 may be configured to limit and/or otherwise reduce bending stresses on load portion 125 when backing plate 88 transmits force FB to torque pad 90.

In some examples, pad body 120 defines a first edge portion 126 and a second edge portion 128. In examples, load portion 125 separates first edge portion 126 and second edge portion 128. First edge portion 126 may be a portion of pad body 120 displaced from pad axis LP in the radial direction R1 when torque pad 90 is displaced from axis A in the radial direction R1. For example, torque pad 90 may be configured such that pad axis LP is between first edge portion 126 and axis of rotation A when boss 92 supports torque pad 90. Second edge portion 128 may be a portion of pad body 120 displaced from pad axis LP in a direction opposite the radial direction R1 when torque pad 90 is displaced from axis A in the radial direction R1. For example, torque pad 90 may be configured such that second edge portion 128 is between pad axis LP and axis of rotation A when boss 92 supports torque pad 90. In some examples, torque pad 90 may be configured to limit and/or otherwise reduce stresses on and/or within first edge portion 126 and/or second edge portion 128 when backing plate pocket 124 transmits force FB to pad face 122.

The reduction of the bending stresses at load portion 125 (and/or at first edge portion 126 and/or second edge portion 128) may allow torque pad 90 to have a more elongated dimension (e.g., a dimension parallel to radial direction R1) when torque pad 90 is to be employed in brake assembly 54 to, for example, provide increased area for the transmission of torque around axis A from the backing plate 88 to torque pad 90. In examples, reduction of the bending stresses on load portion 125 and/or a reduction in reaction forces from first edge portion 126 and/or a second edge portion 128 may reduce stress concentrations in backing plate 88. Torque pad 90 is configured to define one or more convex surfaces on pad face 122 to, for example, assist with and/or cause reduced bending stresses on load portion 125.

For example, torque pad 90 may be configured such that pad face 122 includes a loading surface 134 configured to receive force FB from backing plate 88 (e.g., backing plate back face 93). Pad face 122 may be configured such that loading surface 134 engages backing plate back face 93 when torque pad 90 receives force FB. In examples, pad axis LP intersects (e.g., extends through) loading surface 134. Pad face 122 may further define one or more convex surfaces which substantially curve away from loading surface 134 to, for example, reduce bending stresses on and/or within load portion 125.

For example, pad face 122 may define a first convex surface CV1 which substantially curves away from loading surface 134. Torque pad 90 may be configured such that first convex surface CV1 substantially curves away from loading surface 134 in a direction toward pad back portion 121. In examples, torque pad 90 may be configured such that first convex surface CV1 substantially curves away from backing plate 88 when loading surface 134 engages backing plate 88. For example, first convex surface CV1 may be configured to curve away from backing plate back face 93 when loading surface 134 receives force FB, such that at least some portion of first convex surface CV1 is displaced from backing plate back face 93 when loading surface 134 receives force FB.

In examples, first convex surface CV1 extends from a boundary of loading surface 134 (e.g., loading surface boundary 136 (FIG. 6)) to a first edge 130 ("pad first edge 130") defined by first edge portion 126. First convex surface CV1 may be configured such that, when torque pad 90 develops a force profile across some portion of pad face 122 (e.g., loading surface 134) in response to force FB, the force profile decreases in magnitude as the force profile distributes in a direction from pad axis LP toward first edge 130. In examples, the force profile includes one or more contact forces arising as a result of contact between backing plate back face 93 and pad face 122. First convex surface CV1 may be configured such that at least some portion of first edge portion 126 experiences substantially zero contact forces from backing plate 88 when backing plate 88 imparts force FB to pad face 122 (e.g., loading surface 134). The decrease in magnitude as the force profile distributes in the direction from pad axis LP toward first edge 130 (e.g., enabled by first convex surface CV1) may assist with and/or cause reduced bending stresses on or within load portion 125 when backing plate 88 imparts force FB to torque pad 90.

In examples, instead of or in addition to first convex surface CV1, pad face 122 may define a second convex surface CV2 substantially curving away from loading surface 134 (e.g., in a direction toward pad back portion 121). Second convex surface CV2 may be configured to substantially curve away from backing plate 88 when loading surface 134 engages backing plate 88 (e.g., when loading surface 134 receives force FB). In examples, second convex surface CV2 extends from the boundary of loading surface 134 (e.g., loading surface boundary 136 (FIG. 6)) to a second edge 132 ("pad second edge 132") defined by second edge portion 128. Second convex surface CV2 may be configured such that, when torque pad 90 develops a force profile across some portion of pad face 122 (e.g., loading surface 134) in response to force FB, the force profile decreases in magnitude as the force profile distributes in a direction from pad axis LP toward second edge 132. In some examples, second convex surface CV2 is configured such at least some portion of second edge portion 128 experiences substantially zero contact forces from backing plate 88 when backing plate 88 imparts force FB to pad face 122 (e.g., loading surface 134). The decrease in magnitude as the force profile distributes in the direction from pad axis LP toward second edge 132 (e.g., enabled by second convex surface CV2) may assist with and/or cause reduced bending stresses on or within load portion 125 when backing plate 88 imparts force FB to torque pad 90.

Figure 5:
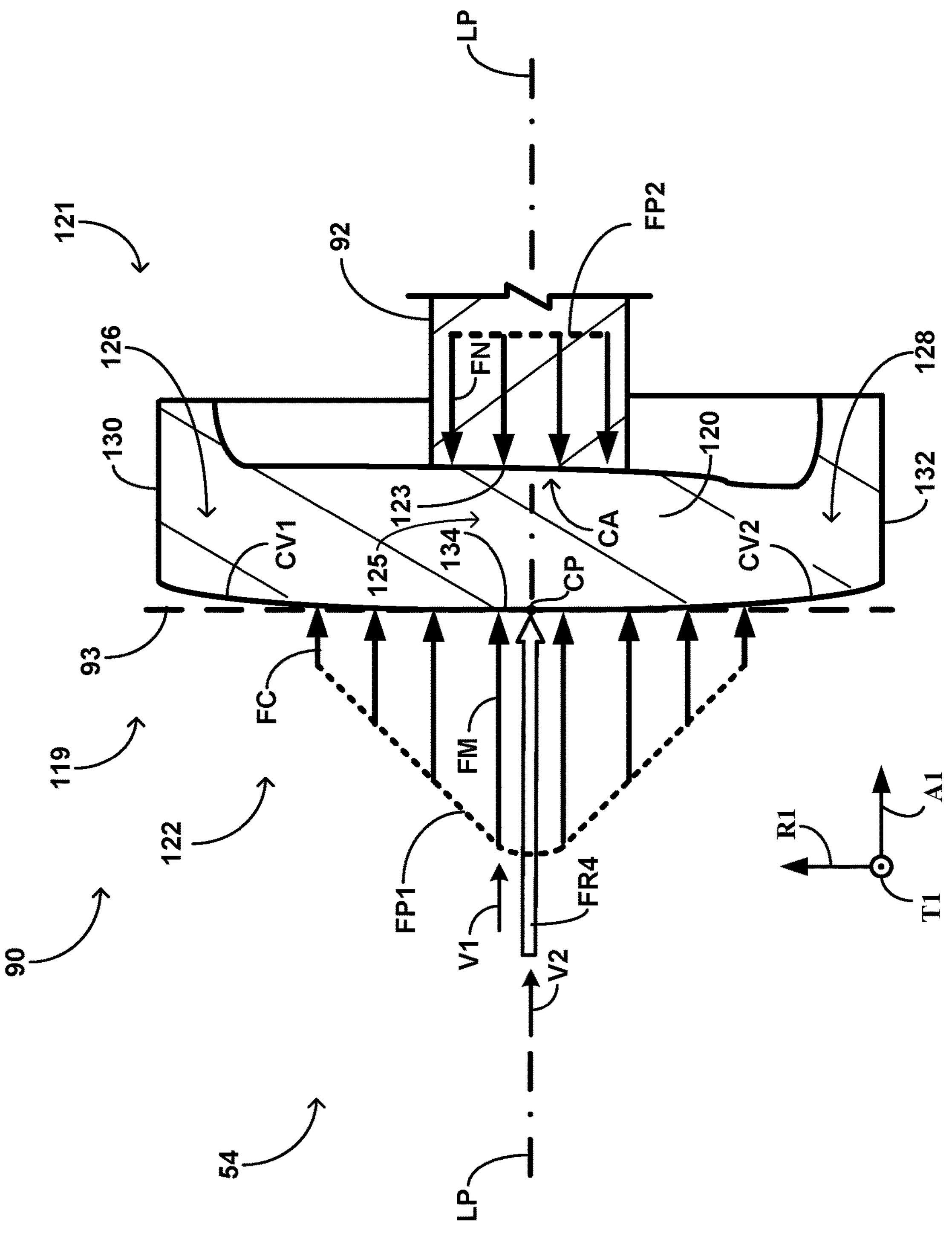
FIG. 5 is a schematic cross-sectional view of an example force profile on a torque pad, with the cutting plane taken parallel to the axial direction and a radial direction of the brake assembly.

For example, FIG. 5 illustrates a schematic cross-sectional view of torque pad 90 supported by boss 92, with backing plate back face 93 shown schematically in dashed lines. In FIG. 5, the cutting plane passes through boss 92 and torque pad 90 and intersects the axial direction A1 of the A1-R1-T1 axes shown. The axial direction A1 is parallel with axis of rotation A.

Torque pad 90 may be configured such that pad face 122 experiences a force profile FP1 when backing plate 88 (e.g., backing plate back face 93) imparts force FB to pad face 122. In examples, force FB imparted from backing plate 88 is a force profile having a force distribution substantially similar to that of force profile FP1. Force profile FP1 may be a section of a force distribution distributed over pad face 122 and extending in the radial direction R1 and the tangential direction T1. For example, force profile FP1 may be a section of the force distribution within the cutting plane of FIG. 5. In examples (e.g., when third convex surface CV3 and/or fourth convex surface CV4 are present) a similar force profile (not shown) may extend in the axial direction A1 and the tangential direction T1.

Torque pad 90 may be configured such that force FB imparts on pad face 122 predominantly via loading surface 134. For example, torque pad 90 (e.g., pad face 122) may be configured such that force profile FP1 developed in response to force FB defines one or more maximum magnitude force vectors such as maximum magnitude vector FM. Torque pad 90 (e.g., pad face 122) may be configured such that maximum magnitude vector FM acts on some portion of loading surface 134. In examples, torque pad 90 (e.g., pad face 122) is configured such that force profile FP1 decreases in magnitude (e.g., decreases from maximum magnitude vector FM) as force profile FP1 distributes in a direction toward first edge portion 126 and/or second edge portion 128. In some examples, torque pad 90 (e.g., pad face 122) is configured such that force profile FP1 decreases in magnitude over loading surface 134 as force profile FP1 distributes in a direction toward first convex surface CV1 and/or second convex surface CV2.

In examples, torque pad 90 is configured to substantially concentrate force profile FP1 on an area of loading surface 134 substantially surrounding pad axis LP. For example, torque pad 90 (e.g., pad face 122) may be configured such that maximum magnitude vector FM acts on a portion of loading surface 134 substantially surrounding pad axis LP.

The portion of loading surface 134 may, for example, a point on loading surface 134 or a small neighborhood of points defined by loading surface 134. In examples, maximum magnitude vector FM acts in a direction from loading surface 134 to boss 92 when boss 92 supports torque pad 90. In some examples, torque pad 90 is configured such that a first vector V1 having the same directional orientation with respect to pad body 120 as maximum magnitude vector FM passes through loading surface 134 and boss 92 when boss 92 supports torque pad 90. In some examples, back face 123 contacts boss 92 over a contact area CA defined by back face 123 when pad face 122 experiences force profile FP1. First vector V1 may pass through loading surface 134 and contact area CA.

In some examples, force profile FP1 and/or the force distribution on pad face 122 defining force profile FP1 defines (e.g., may be expressed as) as a fourth force resultant FR4 (illustrated with dashed line) having a direction which passes through a centroid CP of force profile FP1 and/or the force distribution on pad face 122. In examples, the fourth force resultant FR4 may be substantially the same as the second force resultant of force FB. Torque pad 90 may be configured such that fourth force resultant FR4 intersects loading area 134. In examples, torque pad 90 is configured such that a second vector V2 having the same directional orientation with respect to pad body 120 as fourth force resultant FR4 passes through loading surface 134 and boss 92. In examples, second vector V2 passes through loading surface 134 and contact area CA.

Boss 92 may impart a force profile FP2 on torque pad 90 (e.g., back face 123) when backing plate 88 imparts force FB to pad face 122. Force profile FP2 may include one or more reaction forces imparted to torque pad 90 in response to force FT (FIG. 4) transmitted from torque pad 90 to boss 92 (e.g., via contact area CA). In examples, as discussed, force FT may be a force distribution transmitted from torque pad 90 to boss 92. Force profile FP2 may arise in response to the force distribution transmitted from torque pad 90. In some example, force profile FP2 exhibits substantial reflection symmetry with the force distribution transmitted from torque pad 90 over contact area CA (e.g., reflection symmetry with respect to an axis of symmetry and/or a plane of symmetry between force profile FP2 and the force distribution transmitted from torque pad 90 over contact area CA).

The decrease in the magnitude of force profile FP1 as force profile FP1 distributes in a direction toward first edge portion 126 and/or second edge portion 128 may limit and/or reduce bending stresses on or within load portion 125 when, for example, boss 92 imparts force profile FP2. For example, some portion of force profile FP1 may define a force vector FC. Some portion of force profile FP2 may define a force vector FN acting in a direction substantially opposite of force vector FC. Force vector FC may be displaced in the radial direction R1 (or in a direction opposite the radial direction R1) from force vector FN, such that force vector FB and force vector FN substantially act as a force couple causing a bending moment on pad body 120.

The bending moment may induce bending stresses on or within, for example, load portion 125. Further, the bending moment may be proportional to the magnitude of force vector FC, such that a reduction in the magnitude of force vector FC results in a reduction of the bending moment and the corresponding bending stresses. Hence, when first convex surface CV1 and/or second convex surface CV2 decrease a magnitude of force profile FP1 as force profile FP1 distributes in a direction toward first edge portion 126 and/or second edge portion 128, first convex surface CV1 and/or second convex surface CV2 may act to limit and/or reduce bending stresses on load portion 125.

Figure 7:
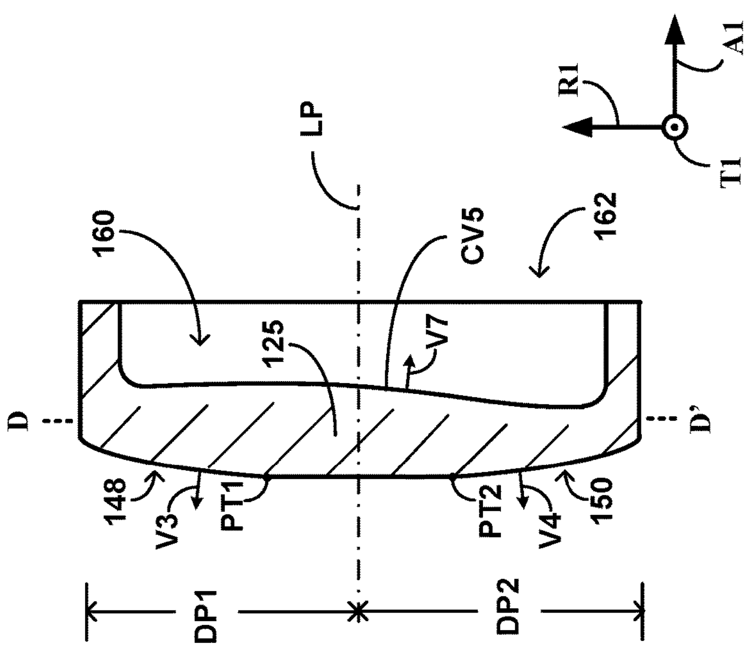
FIG. 7 illustrates a cross-sectional side view of the torque pad of FIG. 6.
Figure 6:
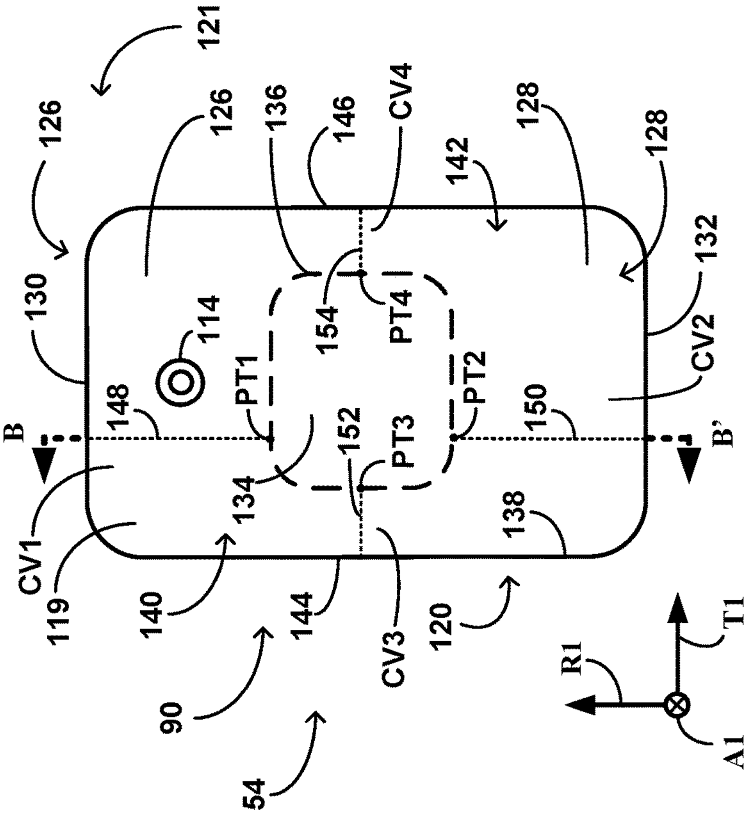
FIG. 6 is a schematic plan view of a torque pad viewed from a direction opposite the axial direction of the brake assembly.
Figure 8:
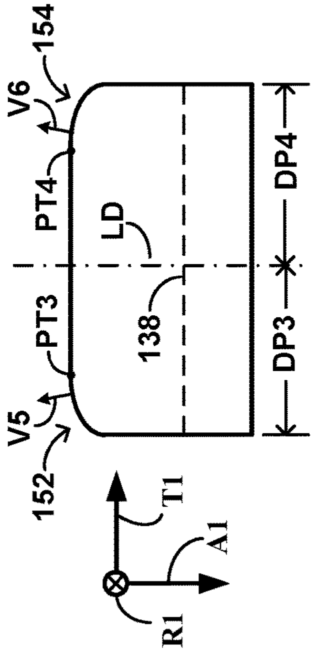
FIG. 8 illustrates a schematic end view of the torque pad of FIG. 6 and FIG. 7.
Figure 9:
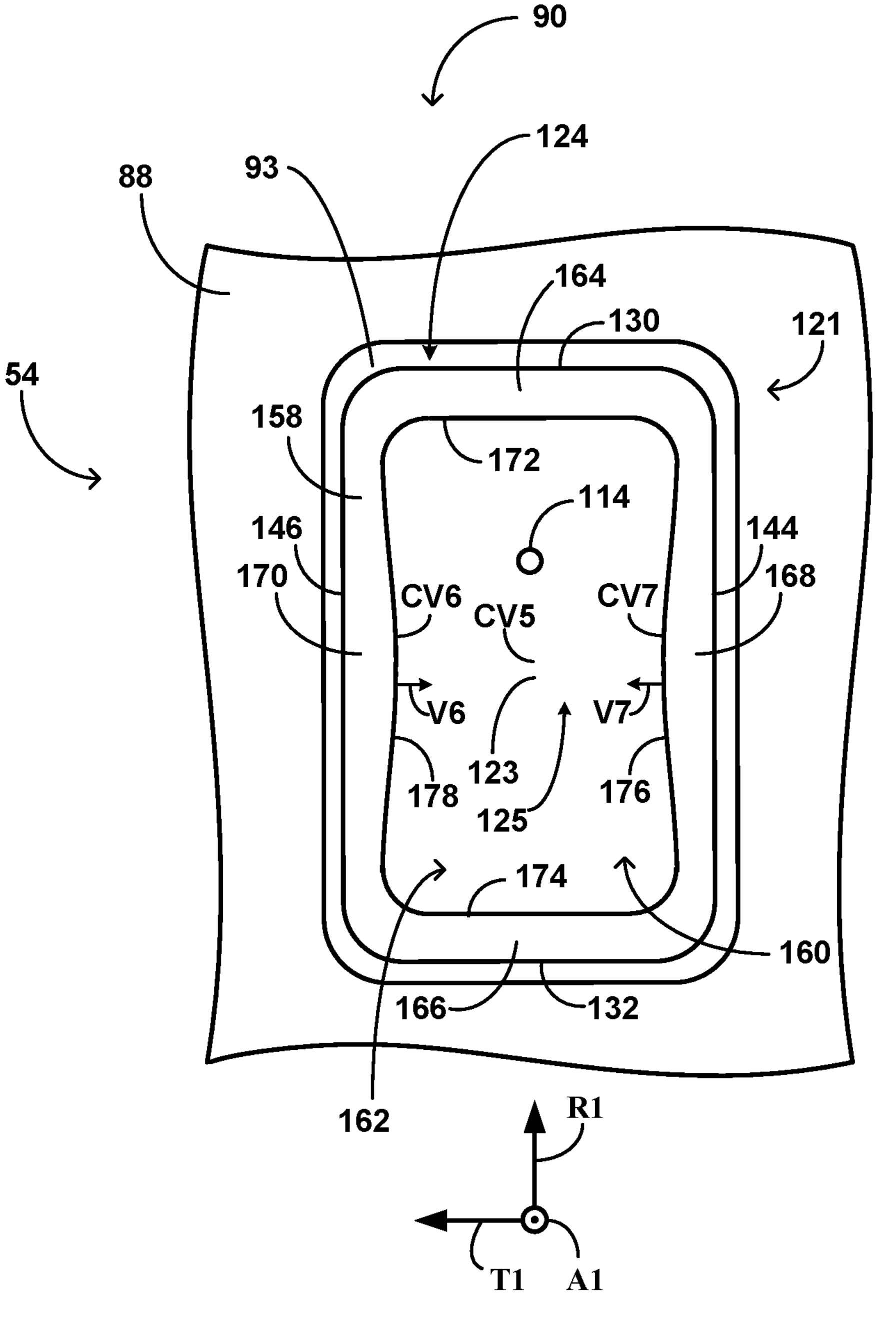
FIG. 9 illustrates a schematic plan view of the torque pad of FIG. 6, FIG. 7, and FIG. 8 viewed from the axial direction of the brake assembly.

FIG. 6 illustrates a schematic plan view of torque pad 90 depicted in accordance with the A1-R1-T1 axes shown (e.g., as viewed looking in the axial direction A1) FIG. 7 illustrates a cross-sectional side view of torque pad 90 depicted in accordance with the A1-R1-T1 axes shown, with the cutting plane taken over and in the direction of the axis B-B' of FIG. 6. FIG. 8 illustrates a schematic end view of torque pad 90, depicted in accordance with the A1-R1-T1 axes shown. FIG. 9 illustrates a schematic plan view of torque pad 90 depicted in accordance with the A1-R1-T1 axes shown (e.g., as viewed looking in a direction opposite the axial direction A1).

Pad face 122 extends from pad first edge 130 to pad second edge 132 and defines loading surface 134. Loading surface 134 may be a substantially contiguous portion of pad face 122. In examples, pad face 122 defines a boundary 136 ("loading surface boundary 136") surrounding loading surface 134. At least loading surface 134 of pad face 122 is configured to engage backing plate 88 at least when backing plate 88 transmits the force FB to torque pad 90. In examples, pad face 122 is configured such that pad front portion 119 fits within (e.g., may position in) backing plate pocket 124 (e.g., when boss 92 supports torque pad 90). In examples, pad face 122 is configured to define loading surface 134 such that at least some portion of loading surface 134 is substantially coplanar with a plane defined by radial direction R1 and tangential direction T1 when boss 92 supports torque pad 90.

Loading surface boundary 136 may define surface 134 to have any shape, including substantially polygonal, circular, elliptical, or some combination thereof. In examples, loading surface boundary 136 defines one or more segments including a curved segment, a curvilinear segment, and/or a linear segment. In some examples, loading surface boundary 134 may be substantially linear, such that loading surface 134 is defined by a substantially linear portion of pad face 122. For example, torque pad 90 may be configured such that first convex surface CV1 and second convex surface CV2 extend substantially to pad axis LP, such that loading surface 134 is limited to a substantially linear region of pad face 122 intersected by pad axis LP. For example, loading surface 134 may be a substantially linear region of pad face 122 substantially parallel to tangential axis T1 when boss 92 supports torque pad 90. In some examples, some portion of first convex surface CV1 and is tangent to some portion of second convex surface CV2. One or more portions of first convex surface CV1 and/or second convex surface CV2 may receive force FB from backing plate 88.

In examples, when torque pad 90 is supported by boss 92 and displaced from axis A in the radial direction R1, pad first edge 130 is displaced from pad second edge 132 in the radial direction R1. Pad first edge 130 may be a portion of first edge portion 126 and/or pad second edge 132 may be a portion of second edge portion 128. In examples, pad first edge 130 defines a maximum extent of pad body 120 from pad axis LP in radial direction R1. For example, pad first edge 130 may define a portion of an outermost perimeter 138 of torque pad 90. In examples, pad second edge 132 defines a maximum extent of pad body 120 from pad axis LP in a direction opposite radial direction R1. For example, pad second edge 132 may define another portion of outermost perimeter 138. In examples, torque pad 90 is configured such that pad axis LP extends through outer perimeter 138. In examples, outermost perimeter 138 defines a maximum displacement defined by pad body 120 from pad axis LP in one or more directions (e.g., substantially all directions) from pad axis LP. As discussed, in examples, pad front portion 119 and pad back portion 121 may be separated substantially by, for example, a plane D-D' parallel to and/or defined by the R1-T1 axes and extending through pad body 120.

First convex surface CV1 and/or second convex surface CV2 may be configured to substantially limit loading surface 134 (e.g., described by loading surface boundary 136) to an area of pad face 122 substantially surrounding pad axis LD. First convex surface CV1 and/or second convex surface CV2 may substantially limit loading surface 134 to, for example, assist in the development of force profile FP1 (FIG. 5) on pad face 122. For example, in examples, pad body 120 defines a displacement DP1 from pad axis LP to pad first edge 130. Torque pad 90 may be configured such that first convex surface CV1 extends over at least 10% of displacement DP1. In examples, first convex surface CV1 extends from pad first edge 130 toward pad axis LP over at least 10% of displacement DP1. In some examples, first convex surface CV1 extends over at least 25%, at least 40%, at least 60%, or at least 80% of displacement DP1. In some examples, first convex surface CV1 extends over substantially all (e.g., substantially 100%) of displacement DP1. Displacement DP1 may be substantially parallel to the radial direction R1 when boss 92 supports torque pad 90.

In examples, pad body 120 defines a displacement DP2 from pad axis LP to pad second edge 132. Torque pad 90 may be configured such that second convex surface CV2 extends over at least 10% of displacement DP2. In examples, second convex surface CV2 extends from pad second edge 132 toward pad axis LP over at least 10% of displacement DP2. In some examples, second convex surface CV2 extends over at least 25%, at least 40%, at least 60%, or at least 80% of displacement DP2. In some examples, second convex surface CV2 extends over substantially all (e.g., substantially 100%) of displacement DP2. Displacement DP2 may be substantially parallel to the radial direction R1 when boss 92 supports torque pad 90. In examples, displacement DP2 is substantially parallel to displacement DP1.

In some examples, first convex surface CV1 defines a surface profile 148 ("first surface profile 148") on pad face 122. First surface profile 148 may be, for example, a portion of first convex surface CV1 intersected by a plane defined by the axial direction A1 and the radial direction R1. In examples, first surface profile 148 defines a convex curvature extending from a point of commencement PT1 ("point PT1") on pad face 122. First surface profile 148 may extend from point PT1 over some portion of first edge portion 126. In examples, first surface profile 148 extends from point PT1 substantially to pad first edge 130. Torque pad 90 may be configured such that first convex surface CV1 and/or first surface profile 148 may exhibit a convexity (e.g., a positive curvature) with respect to a vector V3 normal to and extending from first convex surface CV1 and/or first surface profile 148. Torque pad 90 may be configured such that first convex surface CV1 and/or first surface profile 148 substantially curve away from vector V3.

In examples, first convex surface CV1 defines a curvature less than (e.g., flatter than) a convex surface that might result from a quarter-round or other feature (e.g., a stress-relieving feature) that might be present in the vicinity of where pad face 122 transitions to pad first edge 130. For example, in some examples, first convex surface CV1 and/or first surface profile 148 define a first radius of curvature greater than a radius of curvature that might be defined by a circular arc extending from point PT1 toward pad first edge 130. In examples, the first radius of curvature is greater than a circular arc extending from point PT1 to pad first edge 130.

Second convex surface CV2 may define a surface profile 150 ("second surface profile 150") on pad face 122. Second surface profile 150 may be a portion of second convex surface CV2 intersected by a plane defined by the axial direction A1 and the radial direction R1. In examples, second surface profile 150 defines a convex curvature extending from a point of commencement PT2 ("point PT2") on pad face 122. Second surface profile 150 may extend from point PT2 over some portion of second edge portion 128, such as, in examples, from point PT2 substantially to pad second edge 132. Second convex surface CV2 and/or second surface profile 150 may exhibit a convexity (e.g., a positive curvature) with respect to a vector V4 normal to and extending from second convex surface CV2 and/or second surface profile 150. In examples, second convex surface CV2 and/or second surface profile 150 substantially curve away from vector V4. In some examples, In some examples, second convex surface CV2 and/or second surface profile 150 define a second radius of curvature greater than a radius of curvature that might be defined by a circular arc extending from point PT2 toward and/or extending to pad second edge 132.

Pad body 120 may define a third edge portion 140 and a fourth edge portion 142. Third edge portion 140 may be a portion of pad body 120 displaced from pad axis LP in a direction opposite the tangential direction T1 when torque pad 90 is displaced from axis A in the radial direction R1. Fourth edge portion 142 may be a portion of pad body 120 displaced from pad axis LP in the tangential direction T1 when torque pad 90 is displaced from axis A in the radial direction R1. For example, torque pad 90 may be configured such that pad axis LP extends substantially between third edge portion 140 and fourth edge portion 142. Torque pad 90 may be configured to limit and/or otherwise reduce bending stresses on and/or within load portion 125 when backing plate 88 (e.g., backing plate pocket 124) transmits force FB to pad face 122 (e.g., loading surface 134).

For example, pad face 122 may define a third convex surface CV3 and/or a fourth convex surface CV4 which substantially curve away from loading surface 134. Torque pad 90 may be configured such that third convex surface CV3 and/or a fourth convex surface CV4 substantially curve away from loading surface 134 in a direction toward pad back portion 121. In examples, torque pad 90 is configured such that third convex surface CV3 and/or a fourth convex surface CV4 substantially curve away from backing plate 88 when loading surface 134 engages backing plate 88. For example, third convex surface CV3 and/or a fourth convex surface CV4 may be configured to curve away from backing plate back face 93 when loading surface 134 receives force FB, such that at least some portion of third convex surface CV3 and/or a fourth convex surface CV4 is displaced from backing plate back face 93 when loading surface 134 receives force FB.

In examples, third convex surface CV3 extends from loading surface boundary 136 to a third edge 144 ("pad third edge 144") defined by third edge portion 140. Third convex surface CV3 may be configured such that, when torque pad 90 develops a force profile across some portion of pad face 122 (e.g., loading surface 134) in response to force FB, the force profile decreases in magnitude as the force profile distributes in a direction from pad axis LP toward pad third edge 144. Third convex surface CV3 may be configured such that at least some portion of third edge portion 140 experiences substantially zero contact forces from backing plate 88 when backing plate 88 imparts force FB to pad face 122 (e.g., loading surface 134). The decrease in magnitude as the force profile distributes in the direction from pad axis LP toward pad third edge 144 (e.g., enabled by third convex surface CV3) may assist with and/or cause reduced bending stresses on or within load portion 125 when backing plate 88 imparts force FB to torque pad 90.

Third convex surface CV3 may define a surface profile 152 ("third surface profile 152") on pad face 122. Third surface profile 152 may be a portion of third convex surface CV3 intersected by a plane defined by the axial direction A1 and the tangential direction T1. In examples, third surface profile 152 defines a convex curvature extending from a point of commencement PT3 ("point PT3") on pad face 122. Third surface profile 152 may extend from point PT3 over some portion of third edge portion 140, such as, in examples, from point PT3 substantially to pad third edge 144. Third convex surface CV3 and/or third surface profile 152 may exhibit a convexity (e.g., a positive curvature) with respect to a vector V5 normal to and extending from third convex surface CV3 and/or third surface profile 152. In examples, third convex surface CV3 and/or third surface profile 152 substantially curve away from vector V5. In some examples, third convex surface CV3 and/or third surface profile 152 define a third radius of curvature greater than a radius of curvature that might be defined by a circular arc extending from point PT3 toward and/or extending to pad third edge 144.

Fourth convex surface CV4 may extend from loading surface boundary 136 to a fourth edge 146 ("pad fourth edge 146") defined by fourth edge portion 142. Fourth convex surface CV4 may be configured such that, when torque pad 90 develops a force profile across some portion of pad face 122 (e.g., loading surface 134) in response to force FB, the force profile decreases in magnitude as the force profile distributes in a direction from pad axis LP toward pad fourth edge 146. Fourth convex surface CV4 may be configured such that at least some portion of fourth edge portion 144 experiences substantially zero contact forces from backing plate 88 when backing plate 88 imparts force FB to pad face 122 (e.g., loading surface 134). The decrease in magnitude as the force profile distributes in the direction from pad axis LP toward pad fourth edge 146 (e.g., enabled by fourth convex surface CV4) may assist with and/or cause reduced bending stresses on or within load portion 125 when backing plate 88 imparts force FB to torque pad 90.

Fourth convex surface CV4 may define a surface profile 154 ("fourth surface profile 154") on pad face 122. Fourth surface profile 154 may be a portion of fourth convex surface CV4 intersected by a plane defined by the axial direction A1 and the tangential direction T1. In examples, fourth surface profile 154 defines a convex curvature extending from a point of commencement PT4 ("point PT4") on pad face 122. Fourth surface profile 154 may extend from point PT4 over some portion of fourth edge portion 142, such as, in examples, from point PT4 substantially to pad fourth edge 146. Fourth convex surface CV4 and/or fourth surface profile 154 may exhibit a convexity (e.g., a positive curvature) with respect to a vector V6 normal to and extending from fourth convex surface CV4 and/or fourth surface profile 154. In examples, fourth convex surface CV4 and/or fourth surface profile 154. In some examples, fourth convex surface CV4 and/or fourth surface profile 154 define a fourth radius of curvature greater than a radius of curvature that might be defined by a circular arc extending from point PT4 toward and/or extending to pad fourth edge 146.

In some examples, torque pad 90 may be configured such that third convex surface CV3 and fourth convex surface CV4 extend substantially to pad axis LP. In some examples, loading surface boundary 134 may reduce to a relatively small, point-like neighborhood around pad axis LP. For example, torque pad 90 may be configured such that third convex surface CV3, fourth convex surface CV4, first convex surface CV1, and second convex surface CV2 extend substantially to pad axis LP, such that loading surface 134 is limited to a relatively small neighborhood surrounding pad axis LP. In some examples, some portion of third convex surface CV3 and is tangent to some portion of fourth convex surface CV4. One or more portions of third convex surface CV3 and/or fourth convex surface CV4 may receive force FB from backing plate 88.

In examples, pad body 120 defines a displacement DP3 from pad axis LP to pad third edge 144 and/or defines a displacement DP4 from pad axis LP to pad fourth edge 146. Torque pad 90 may be configured such that third convex surface CV3 extends over at least 10% of displacement DP3 and/or fourth convex surface CV4 extends over at least 10% of displacement DP4. In some examples, third convex surface CV3 extends over at least 25%, at least 40%, at least 60%, or at least 80% of displacement DP3. Fourth convex surface CV4 may extend over at least 25%, at least 40%, at least 60%, or at least 80% of displacement DP4. In some examples, third convex surface CV3 extends over substantially all (e.g., substantially 100%) of displacement DP3. Fourth convex surface CV4 may extend over substantially all (e.g., substantially 100%) of displacement DP4. Displacement DP3 and/or displacement DP4 may be substantially parallel to the tangential direction T1 when boss 92 supports torque pad 90. In examples, displacement DP4 is substantially parallel to displacement DP3.

Outer perimeter 138 may define one or more cross-sectional dimensions of pad body 120. For example, outer perimeter 138 may define a first cross-sectional dimension substantially parallel to radial direction R1 and a second cross-sectional dimension substantially parallel to tangential direction T1. In examples, pad first edge 130 is displaced from pad second edge 132 substantially by the first cross-sectional dimension. In examples, pad third edge 144 is displaced from pad fourth edge 146 substantially by the second cross-sectional dimension. In examples, one or more of pad first edge 130, pad second edge 132, pad third edge 144 and/or pad fourth edge 146 define at least some portion of outer perimeter 138. In some examples, pad first edge 130, pad second edge 132, pad third edge 144 and pad fourth edge 146 define at least a portion of outer perimeter 138 (e.g., substantially all of outer perimeter 138). In some examples, outer perimeter 138 surrounds pad first edge 130, pad second edge 132, pad third edge 144, and pad fourth edge 146.

Torque pad 90 may be configured such that pad body 120 may move relative to boss 92 to assist in establishing a loading path for forces transferred from backing plate 88 (FIGS. 2-4) to boss 92. In examples, torque pad 90 (e.g., pad body 120) defines one or more convex surfaces configured to assist in establishing the loading path. The convex surface of the one or more convex surfaces may be configured to transmit forces from backing plate 88 to boss 92 in a direction substantially normal to the convex surface, or in a direction closer to normal than might be present in the absence of the convex surface. In examples, torque pad 90 is configured to move (e.g., shift) relative to boss 92 when the convex surface transmits force to and/or receives forces from boss 92.

For example, backing plate 88 may be configured to impart force FB in the axial direction A1 on pad face 122 (e.g., loading surface 134) during operations of brake assembly 54. Pad body 120 is configured to transfer force FB from loading surface 134 to boss 92 via back face 123 (using force FT). Back face 123 may be configured to define a fifth convex surface CV5 configured to allow torque pad 90 to move relative to boss 92 when loading surface 134 receives force FB, such that back face 123 transmits force FT to boss 92 in a direction substantially normal to fifth convex surface CV5. For example, in response to force FB in a direction deviating from axial direction A1, contact between boss 92 and fifth convex surface CV5 of back face 123 may cause torque pad 90 (e.g., pad body 120) to pivot slightly until force FT from back face 123 transmits through the fifth convex surface CV5 to boss 92 in the direction substantially normal to fifth convex surface CV5 or closer to a normal of fifth convex surface CV5. Back face 123 may be configured to permit movement of torque pad 90 relative to boss 92 such that back face 123 transmits forces to boss 92 in a direction substantially normal or closer to a normal of back face 123.

In examples, fifth convex surface CV5 defines a convexity curving in a direction substantially opposite a convexity defines by first convex surface CV1, second convex surface CV2, third convex surface CV3, and/or fourth convex surface CV4. In examples, fifth convex surface CV5 defines a surface profile 156 ("fifth surface profile 156") on back face 123. Fifth surface profile 156 may be a portion of fifth convex surface CV5 intersected by a plane defined by the axial direction A1 and the radial direction R1. In examples, fifth convex surface CV5 and/or fifth surface profile 156 exhibit a convexity (e.g., a positive curvature) with respect to a vector V7 normal to and extending from fifth surface profile 156, such that fifth convex surface CV5 and/or fifth surface profile 156 substantially curves away from vector V7. In some examples, fifth convex surface CV5 extends from pad axis LP in the radial direction R1 at least to or beyond point PT1. Fifth convex surface CV5 may extend from pad axis LP in a direction opposite the radial direction R1 at least to or beyond point PT2.

Referring to FIG. 9, In examples, torque pad 90 defines a boundary 158 ("pad boundary 158") at least partially surrounding back face 123. In examples, pad boundary 158 may define one or more of pad first edge 130, pad second edge 132, pad third edge 144, and/or pad fourth edge 146. In examples, pad boundary 158 is substantially raised relative to back face 123, such that pad boundary 158 extends in a direction away from back face 123. In examples, pad boundary 158 defines a recess 160 ("pad recess 160") within pad back portion 121. Pad recess 160 may extend into pad back portion 121 in a direction toward pad face 122. In examples, pad recess 160 is bounded at least in part by back face 123. In examples, pad body 120 (e.g., pad boundary 158) defines a back opening 162 which opens into pad recess 160. Torque pad 90 may be configured such that boss 92 passes through back opening 162 when boss 92 inserts into pad recess 160.

In some examples, pad body 120 defines one or more of a first wall 164, a second wall 166, a third wall 168, and/or a fourth wall 170 defining at least some portion of pad boundary 158. First wall 164 may include and/or define pad first edge 130. Second wall 166 may include and/or define pad second edge 132. Third wall 168 may include and/or define pad third edge 144. Fourth wall 170 may include and/or define pad fourth edge 146. In examples, pad body 120 (e.g., pad back portion 121) is configured such that first wall 164, second wall 166, third wall 168, and fourth wall 170 surround a volume defining pad recess 160. In examples, first wall 164, second wall 166, third wall 168, and fourth wall 170 define at least some portion of (e.g., all of) a boundary of back opening 162. In examples, pad recess 160 is bounded and/or defined at least in part by two or more of (e.g., all of) first wall 164, second wall 166, third wall 168, fourth wall 170, and/or back face 123. For example, pad recess 160 may be defined and/or bounded by back face 123, first wall 164, second wall 166, third wall 168, fourth wall 170, and back opening 162. Torque pad 90 may be configured such that at least some portion of attachment structure 114 positions within, opens into, and/or is at least partially surrounded by the volume defining pad recess 160.

In some examples, first wall 172 includes (e.g., defines) pad first edge 130 facing in a direction outward from pad recess 160 (e.g., in radial direction R1) and an inner edge 172 ("first inner edge 172") facing inward toward pad recess 160 (e.g., in a direction opposite radial direction R1). Second wall 166 may include (e.g., define) pad second edge 132 facing in a direction outward from pad recess 160 (e.g., in the direction opposite radial direction R1) and an inner edge 174 ("second inner edge 174") facing inward toward pad recess 160 (e.g., in radial direction R1). Third wall 168 may include (e.g., define) pad third edge 144 facing in a direction outward from pad recess 160 (e.g., in tangential direction T1) and an inner edge 176 ("third inner edge 176") facing inward toward pad recess 160 (e.g., in a direction opposite tangential direction T1). Fourth wall 170 may include (e.g., define) pad fourth edge 146 facing in a direction outward from pad recess 160 (e.g., in the direction opposite tangential direction T1) and an inner edge 178 ("fourth inner edge 178") facing inward toward pad recess 160 (e.g., in tangential direction T1). Pad recess 160 may be bounded and/or defined at least in part by two or more of (e.g., all of) first inner edge 172, second inner edge 174, third inner edge 176, and/or fourth inner edge 178. In examples, pad recess 160 is defined and/or bounded by back face 123, first inner edge 172, second inner edge 174, third inner edge 176, fourth inner edge 178, and back opening 162.

Torque pad 90 may be configured such that pad body 120 may move relative to boss 92 to assist in establishing a loading path for a force ("tangential force") transferred generally parallel to the first tangential direction T1 from backing plate 88 to boss 92 (FIGS. 2-5). In examples, torque pad 90 (e.g., pad back portion 121) defines one or more back portion convex surfaces configured to assist in establishing the loading path for the tangential force. A back portion convex surface may be configured to transmit the tangential force backing plate 88 to boss 92 in a direction substantially normal to the back portion convex surface, or in a direction closer to normal than might be present in the absence of the back portion convex surface. In examples, torque pad 90 is configured to move (e.g., shift) relative to boss 92 when the back portion convex surface transmits the tangential force to and/or receives a force from boss 92.

For example, backing plate 88 may be configured to impart a tangential force generally in a direction opposite first tangential direction T1 on pad fourth edge 146 during operations of brake assembly 54. Fourth wall 170 may be configured to transfer the force from pad fourth edge 146 to boss 92 via fourth inner edge 178. Fourth inner edge 178 may be configured to define a back portion convex surface CV6 configured to allow torque pad 90 to move relative to boss 92 when pad fourth edge 146 receives the force from backing plate 88, such that fourth inner edge 178 transmits the force to boss 92 in a direction substantially normal to back portion convex surface CV6. For example, in response to a force from backing plate 88 to pad fourth edge 146 in a direction deviating from the direction opposite tangential direction T1, contact between boss 92 and back portion convex surface CV6 of fourth inner edge 178 may cause torque pad 90 (e.g., pad body 120) to pivot slightly until the force from backing plate 88 transmits through back portion convex surface CV6 to boss 92 in the direction substantially normal to back portion convex surface CV6 or closer to a normal to back portion convex surface CV6. Hence, fourth inner edge 178 may be configured to permit movement of torque pad 90 relative to boss 92 such that fourth inner edge 178 transmits forces to boss 92 in a direction substantially normal or closer to normal to fourth inner edge 178. In examples, back portion convex surface CV6 exhibits a convexity (e.g., a positive curvature) with respect to a vector V6 normal to and extending from fourth inner edge 178, such that back portion convex surface CV6 substantially curves away from vector V6.

In examples, third inner edge 176 defines a back portion convex surface CV7 configured to allow torque pad 90 to move relative to boss 92 when pad third edge 144 receives a force from backing plate 88 such that, for example, third inner edge 176 transmits the force to boss 92 in a direction substantially normal to back portion convex surface CV7, or in a direction closer to a normal of CV7 than might be present in the absence of back portion convex surface CV7. For example, in response to a force from backing plate 88 to pad third edge 144 in a direction deviating from the tangential direction T1, contact between boss 92 and back portion convex surface CV7 of third inner edge 176 may cause torque pad 90 (e.g., pad body 120) to pivot slightly until the force from backing plate 88 transmits through back portion convex surface CV7 to boss 92 in the direction substantially normal to back portion convex surface CV7 or closer to a normal to back portion convex surface CV7. In examples, back portion convex surface CV7 exhibits a convexity (e.g., a positive curvature) with respect to a vector V7 normal to and extending from third inner edge 176, such that back portion convex surface CV7 substantially curves away from vector V7.

In examples, as discussed, torque pads 108 and bosses 110 may be radially displaced from axis A around perimeter P1 (FIG. 3). In some examples, one or more of torque pads 108 and/or one or more of bosses 110 may be radially displaced from axis A by an individual radius from axis A. The individual radii may define a different displacement for each of torque pads 108 and/or bosses 110 and/or substantially similar displacements for one or more of torque pads 108 and/or bosses 110. In examples, brake assembly 54 is configured such that torque pads 108 and/or bosses 110 define a substantially circumferential pattern around axis A. Torque pads 108 and/or bosses 110 may be evenly or unevenly spaced around axis A. For example, torque pads 108 and/or bosses 110 may be spaced such that a spacing distance (e.g., an arc length) between an adjacent torque pad or boss is substantially equal around axis A. In examples, torque pads 108 and/or bosses 110 may be spaced such that the spacing distance (e.g., the arc length) between adjacent an adjacent torque pad or boss varies around axis A. The spacing distance and/or arc length may be defined in a plane substantially perpendicular to axis A.

Torque pads described herein, including torque pad 90, second torque pad 94, third torque pad 98, and/or other of torque pads 108, as well as wheel 10 and brake assembly 54, and the components thereof, may be made from any suitable material. For example, the material may be any material of suitable strength for the intended use of one or more of torque pads 108, wheel 10, brake assembly 54, and the components thereof. In some examples, the material includes a metal or a metal alloy, such as an Inconel. In some examples, the material may include a nickel alloy or steel alloy, such as a stainless steel.

Torque pads 108, wheel 10, brake assembly 54, and the components thereof may be formed using any suitable technique. Torque pads 108, wheel 10, brake assembly 54, and the components thereof may be forged, casted, made from bar stock, additive manufactured (e.g., three-dimensionally (3D) printed), extruded, drawn, or be produced using other suitable methods. In some examples, torque pads 108, wheel 10, brake assembly 54, and the components thereof may be machined to define the configurations described herein. In other examples, torque pads 108, wheel 10, brake assembly 54, and the components thereof may be formed without having to be substantially machined.

Disc stack 65 may include components additional to those depicted in FIGS. 2-9 and/or described above. For example, disc stack 65 can include one or more rotor drive inserts configured to insert at least partially within a drive slot of rotor disc 66, 68, 70, 72. As another example, disc stack 65 may include one or more spline inserts configured to insert at least partially within a spline slot of stator disc 74, 76, 78. As used herein, disc stack 65 may include one or more rotor discs such as rotor disc 66, 68, 70, 72, one or more stator discs such as stator disc 74, 76, 78, and other components configured to rotate and/or translate as a substantially rigid body with at least one of the rotor discs and/or the stator discs.

Brake discs described herein, including rotor discs 66, 68, 70, 72 and stator discs 74, 76, 78, may be manufactured from any suitable material. In some examples, the brake discs described herein may be manufactured from a metal or a metal alloy, such as a steel alloy. In some examples, the brake discs may be manufactured using a ceramic material, such as a ceramic composite. In some examples, the brake discs may be manufactured from a carbon-carbon composite material. In some examples, the brake discs may be manufactured using a carbon-carbon composite material having a high thermal stability, a high wear resistance, and/or stable friction properties. The brake discs may include a carbon material with a plurality of carbon fibers and densifying material. The carbon fibers may be arranged in a woven or non-woven as either a single layer or multilayer structure.

As used here, when a first portion of a system (e.g., brake assembly 54) is substantially parallel to a second portion of or an axis defined by the system, this may mean the first portion is parallel or nearly parallel to the second portion or the axis to the extent permitted by manufacturing tolerances. In some examples, when the first portion is substantially parallel to the second portion or the axis, this may mean a first vector defined by the first component of the system defines an angle of less than 10 degrees, in some examples less than 5 degrees, and in some examples less than 1 degree, with a second vector defined by the second component or the axis. When a first portion of the system is substantially perpendicular to a second portion of or an axis defined by the system, this may mean the first portion is perpendicular or nearly perpendicular to the second portion or the axis to the extent permitted by manufacturing tolerances. In some examples, when the first portion is substantially perpendicular to the second portion or the axis, this may mean that the first vector defined by the first component of the system defines an angle of at least 80 degrees, in some examples at least 85 degrees, and in some examples at least 89 degrees, with the second vector defined by the second component.

As used here, when a first portion of a system (e.g., brake assembly 54) supports a second portion of the system, this means that when the second portion causes a first force to be exerted on the first portion, the first portion causes a second force to be exerted on the second portion in response to the first force. The first force and/or second force may be a contact force and/or an action-at-a-distance force. For example, first force and/or second force may be mechanical force, a magnetic force, a gravitational force, or some other type of force. The first portion of the system may be a portion of the system or a portion of a component of the system. The second portion of the system may be another portion of the system or another portion of the same component or a different component. In some examples, when the first portion of the system supports the second portion of the system, this may mean the second portion is mechanically supported by and/or mechanically connected to the first portion.

Figure 10:
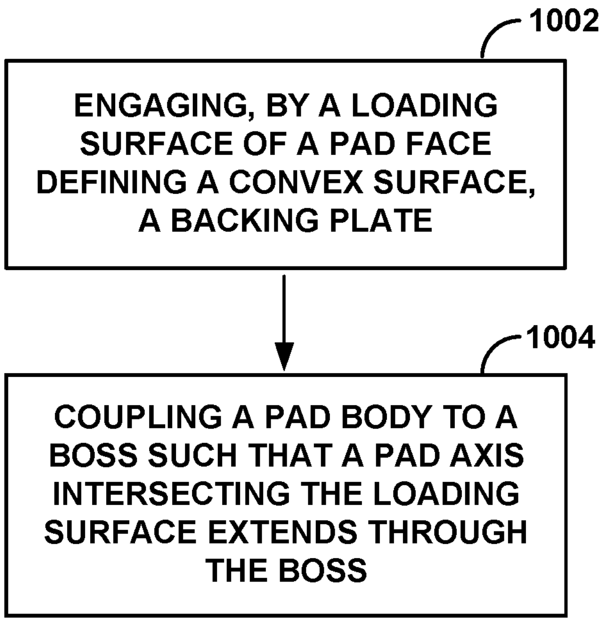
FIG. 10 is a flow diagram illustrating an example method of engaging a backing plate with a loading surface of a torque pad.

FIG. 10 is a flow diagram illustrating an example technique for engaging a toque pad using a backing plate of a brake assembly. While the technique is described with reference to torque pad 90 and brake assembly 54 described herein, the technique may be used with other components in other examples.

The technique includes engaging, by a loading surface 134 of a pad face 122 defining at least one of first convex surface CV1 or second convex surface CV2, a backing plate 88 of a brake assembly 54 (1002). Brake assembly 54 (e.g., actuator 82) may compress a disc stack 65 to cause the engagement of loading surface 134 and backing plate 88. Actuator 82 may exert an actuator force FA to compress of disc stack 65 substantially between a pressure plate 86 and backing plate 88. In examples, brake assembly transmits a force FS to backing plate 88. Backing plate 88 may transmit a force FB to loading surface 134 in response to force FS. In examples, a torque pad 90 defining pad face 122 is positioned at least partially within backing plate pocket 124. Backing plate 88 may receive force FS via backing plate front face 91 and transmit force FB to loading surface 134 via backing plate back face 93.

The technique includes coupling a pad body 120 defining pad face 122 to a boss 92 of brake assembly 54 (1004). Pad body 120 may couple to boss 92 such that a pad axis LP extending through loading surface 134 extends through boss 92. In examples, pad body 120 receives force FB via pad front portion 119 and transmits a force FT to boss 92 via pad back portion 121. In examples, a back face 123 defined by pad back portion 121 engages boss 92 when pad back portion 121 transmits force FT to boss 92. In examples, pad back portion 121 transmits force FT to boss 92 via back face 123.

Pad face 122 may develop a force profile FP1 across loading surface 134 in response to receiving force FB from backing plate 88. Force profile FP1 may decrease in magnitude as force profile FP1 distributes in a direction from pad axis LP to an edge (e.g., a pad first edge 130 or a pad second edge 132) of torque pad 90. Pad face 122 may cause the decrease in magnitude of force profile FP1 using at least one of first convex surface CV1 extending from loading surface 134 to pad first edge 130 or second convex surface CV2 extending from loading surface 134 to pad second edge 132 of torque pad 90. In examples, pad face 122 causes force profile FP to decrease in magnitude using both first convex surface CV1 and second convex surface CV2.

Torque pad 90 may substantially concentrate force profile FP1 on an area of loading surface 134 substantially surrounding pad axis LP. For example, torque pad 90 (e.g., pad face 122) may cause a maximum magnitude vector FM to act on a portion of loading surface 134 substantially surrounding pad axis LP. In examples, maximum magnitude vector FM acts in a direction from loading surface 134 to boss 92 when boss 92 supports torque pad 90. In some examples, back face 123 contacts boss 92 over a contact area CA when pad face 122 experiences force profile FP1. Maximum magnitude vector FM may act in a direction from loading surface 134 through contact area CA.

Torque pad 90 may limit and/or minimize bending stresses in load portion 125 of pad body 120 using first convex surface CV1 when backing plate 88 imparts force FB to pad body 120. Torque pad 90 may limit and/or minimize bending stresses in load portion 125 of pad body 120 using second convex surface CV2 when backing plate 88 imparts force FB to pad body 120. In examples, torque pad 90 limits and/or minimizes bending stresses in load portion 125 using third convex surface CV3 when backing plate 88 imparts force FB to pad body 120. Torque pad 90 may limit and/or minimize bending stresses in load portion 125 using fourth convex surface CV4 when backing plate 88 imparts force FB to pad body 120.

Torque pad 90 may move (e.g., shift and/or pivot slightly) relative to boss 92 when backing plate 88 imparts force FB on torque pad 90. In examples, pad body 120 moves relative to boss 92 when fifth convex surface CV5 of back face 123 transmits force FT to boss 92. Fifth convex surface CV5 may establish a loading path for force FB based on the movement of torque pad 90 relative to boss 92. In examples, fifth convex surface CV5 causes back face 123 to transmit the force imparted by backing plate 88 to boss 92 in a direction substantially normal or closer to a normal of fifth convex surface CV5 when fifth convex surface CV5 transmits the force imparted by backing plate 88 on torque pad 90 to boss 92.

In examples, pad body 120 moves relative to boss 92 when back portion convex surface CV6 of fourth wall 170 transmits a tangential force from backing plate 88 to boss 92. Back portion convex surface CV6 may establish a loading path for the tangential force based on the movement of torque pad 90 relative to boss 92. In examples, back portion convex surface CV6 causes fourth wall 170 to transmit the tangential force from backing plate 88 to boss 92 in a direction substantially normal or closer to a normal of back portion convex surface CV6 when torque pad 90 moves relative to boss 92. In examples, back portion convex surface CV7 causes third wall 168 to transmit a tangential force from backing plate 88 to boss 92 in a direction substantially normal or closer to a normal of back portion convex surface CV7 when torque pad 90 moves relative to boss 92.

The present disclosure includes the following examples.

Example 1: A torque pad comprising: a pad body defining a front portion and a back portion opposite the front portion, the front portion defining a pad face having a loading surface configured to engage a backing plate of a brake assembly, and the back portion configured to couple to a boss of the brake assembly, wherein the pad body defines a pad axis intersecting the loading surface and the boss when the back portion couples to the boss, wherein the pad face defines a convex surface extending from the loading surface toward an edge of the pad body, wherein the edge is one of a first edge of the pad body or a second edge of the pad body, and wherein the pad face extends from the first edge to the second edge and the pad axis extends between the first edge and the second edge.

Example 2: The torque pad of example 1, wherein the convex surface curves away from the loading surface in a direction toward the back portion.

Example 3: The torque pad of example 1 or example 2, wherein the convex surface is a first convex surface extending toward the first edge, and wherein the pad face defines a second convex surface extending from the loading surface toward the second edge.

Example 4: The torque pad of any of examples 1-3, wherein the loading surface separates the first convex surface and the second convex surface.

Example 5: The torque pad of any of examples 1-4, wherein the convex surface defines a surface profile on the pad face, wherein the surface profile extends from a point of commencement on the pad face to the edge, and wherein the convex surface defines a radius of curvature greater than a radius of curvature defined by a circular arc extending from the point of commencement to the edge.

Example 6: The torque pad of any of examples 1-5, wherein the convex surface extends over at least ten percent of a displacement defined by the pad body from the pad axis to the edge.

Example 7: The torque pad of any of examples 1-6, wherein the pad face is configured to develop a force profile over the loading surface when the torque pad transmits a force from the backing plate to the boss, and wherein the convex surface is configured to cause the force profile to decrease in magnitude as the force profile extends from the pad axis toward the edge.

Example 8: The torque pad of any of examples 1-7, wherein the convex surface has a positive curvature with respect to a vector normal to and extending from the convex surface.

Example 9: The torque pad of any of examples 1-8, wherein: the pad face is configured to receive a first force in a first direction parallel to the pad axis from the backing plate, the pad body defines an additional edge configured to receive a second force in a second direction perpendicular to the first direction, the additional edge comprising one of a third edge or a fourth edge, and the pad body is configured to transmit the second force from the additional edge to the boss when the back portion couples to the boss.

Example 10: The torque pad of example 9, wherein the pad body is configured to transmit the second force from the additional edge to an inner convex surface defined by the pad body, wherein the inner convex surface is configured to transmit the second force to the boss when the back portion couples to the boss and the additional edge receives the second force.

Example 11: The torque pad of example 9 or example 10, wherein the pad face defines an additional convex surface extending from the loading surface toward the additional edge.

Example 12: The torque pad of any of examples 1-11, wherein the back portion defines a back face configured to transmit a force from the backing plate to the boss when the back portion couples to the boss and the backing plate exerts the force on the pad body.

Example 13: The torque pad of example 12, wherein the back face defines a back face convex surface configured to transmit a force from the backing plate to the boss.

Example 14: The torque pad of any of examples 1-13, wherein the pad body defines a third edge extending between the first edge and the second edge and a fourth edge extending between the first edge and the second edge, the pad face extends from the third edge to the fourth edge and the pad axis extends between the third edge and the fourth edge, the back portion defines a pad recess configured to receive the boss when the back portion couples to the boss, and the first edge, the second edge, the third edge, and the fourth edge surround the pad recess.

Example 15: The torque pad of any of examples 1-14, further comprising: a torque tube defining the boss, and the backing plate, wherein the pad body is configured to insert into a backing plate pocket defined by the backing plate when the pad face engages the backing plate.

Example 16: A torque pad comprising: a pad body defining a front portion and a back portion opposite the front portion, the front portion defining a pad face having a loading surface configured to engage a backing plate of a brake assembly, and the back portion configured to couple to a boss of the brake assembly, wherein the pad body defines a pad axis intersecting the loading surface and the boss when the back portion couples to the boss, wherein the pad face defines a first convex surface extending from the loading surface to a first edge of the pad body and a second convex surface extending from the loading surface to a second edge of the pad body, the pad face extending from the first edge to the second edge, wherein the loading surface separates the first convex surface and the second convex surface, and wherein the first convex surface curves away from the loading surface in a direction toward the back portion and the second convex surface curves away from the loading surface in the direction toward the back portion.

Example 17: The torque pad of example 16, wherein: the pad face is configured to receive a first force in a first direction parallel to the pad axis from the backing plate, the pad body defines an additional edge configured to receive a second force in a second direction perpendicular to the first direction, the additional edge comprising one of a third edge or a fourth edge, the pad body is configured to transmit the second force from the additional edge to the boss when the back portion couples to the boss, and the pad face defines an additional convex surface extending from the loading surface toward the additional edge.

Example 18: The torque pad of example 16 or example 17, wherein the first convex surface extends over at least ten percent of a first displacement defined by the pad body from the first edge to the pad axis, and wherein the second convex surface extends over at least ten percent of a second displacement defined by the pad body from the second edge to the pad axis.

Example 19: A method comprising: engaging, by a loading surface of a pad face defined by a front portion of a pad body, a backing plate of a brake assembly, wherein the pad body defines a pad axis intersecting the loading surface and the pad face defines a convex surface extending from the loading surface to an edge of the pad body, wherein the edge is one of a first edge of the pad body or a second edge of the pad body, and wherein the pad face extends from the first edge to the second edge and the pad axis extends between the first edge and the second edge; and coupling, using a back portion of the pad body opposite the front portion, the pad body to a boss of the brake assembly such that the pad axis intersects the boss.

Example 20: The torque pad of example 19, further comprising transmitting, using a back face defined by the back portion, a force to the boss when the backing plate exerts the force on the loading surface.

Various examples have been described. These and other examples are within the scope of the following claims.

What is claimed is:

1. A torque pad comprising:

a pad body defining a front portion and a back portion opposite the front portion, the front portion defining a pad face having a loading surface configured to engage a backing plate of a brake assembly, and the back portion configured to couple to a boss of the brake assembly, wherein:

the pad body defines a pad axis intersecting the loading surface and the boss when the back portion couples to the boss, the pad face defines a convex surface extending from the loading surface toward an edge of the pad body, the edge is one of a first edge of the pad body or a second edge of the pad body, the pad face extends from the first edge to the second edge and the pad axis extends between the first edge and the second edge, and the convex surface defines a surface profile on the pad face, wherein the surface profile extends from a point of commencement on the pad face to the edge, and wherein the convex surface defines a radius of curvature greater than a radius of curvature defined by a circular arc extending from the point of commencement to the edge.

2. The torque pad of claim 1, wherein the convex surface curves away from the loading surface in a direction toward the back portion.

3. The torque pad of claim 1, wherein the convex surface is a first convex surface extending toward the first edge, and wherein the pad face defines a second convex surface extending from the loading surface toward the second edge.

4. The torque pad of claim 3, wherein the loading surface separates the first convex surface and the second convex surface.

5. The torque pad of claim 1, wherein the convex surface extends over at least ten percent of a displacement defined by the pad body from the pad axis to the edge.

6. The torque pad of claim 1, wherein the pad face is configured to develop a force profile over the loading surface when the torque pad transmits a force from the backing plate to the boss, and wherein the convex surface is configured to cause the force profile to decrease in magnitude as the force profile extends from the pad axis toward the edge.

7. The torque pad of claim 1, wherein the convex surface has a positive curvature with respect to a vector normal to and extending from the convex surface.

8. The torque pad of claim 1, wherein:

the pad face is configured to receive a first force in a first direction parallel to the pad axis from the backing plate, the pad body defines an additional edge configured to receive a second force in a second direction perpendicular to the first direction, the additional edge comprising one of a third edge or a fourth edge, and the pad body is configured to transmit the second force from the additional edge to the boss when the back portion couples to the boss.

9. The torque pad of claim 8, wherein the pad body is configured to transmit the second force from the additional edge to an inner convex surface defined by the pad body, wherein the inner convex surface is configured to transmit the second force to the boss when the back portion couples to the boss and the additional edge receives the second force.

10. The torque pad of claim 8, wherein the pad face defines an additional convex surface extending from the loading surface toward the additional edge.

11. The torque pad of claim 1, wherein the back portion defines a back face configured to transmit a force from the backing plate to the boss when the back portion couples to the boss and the backing plate exerts the force on the pad body.

12. The torque pad of claim 11, wherein the back face defines a back face convex surface configured to transmit a force from the backing plate to the boss.

13. The torque pad of claim 1, wherein:

the pad body defines a third edge extending between the first edge and the second edge and a fourth edge extending between the first edge and the second edge, the pad face extends from the third edge to the fourth edge and the pad axis extends between the third edge and the fourth edge, the back portion defines a pad recess configured to receive the boss when the back portion couples to the boss, and the first edge, the second edge, the third edge, and the fourth edge surround the pad recess.

14. The torque pad of claim 1, further comprising:

a torque tube defining the boss, and the backing plate, wherein the pad body is configured to insert into a backing plate pocket defined by the backing plate when the pad face engages the backing plate.

15. A torque pad comprising:

a pad body defining a front portion and a back portion opposite the front portion, the front portion defining a pad face having a loading surface configured to engage a backing plate of a brake assembly, and the back portion configured to couple to a boss of the brake assembly, wherein the pad body defines a pad axis intersecting the loading surface and the boss when the back portion couples to the boss, wherein the pad face defines a first convex surface extending from the loading surface to a first edge of the pad body and a second convex surface extending from the loading surface to a second edge of the pad body, the pad face extending from the first edge to the second edge, wherein the loading surface separates the first convex surface and the second convex surface, wherein the first convex surface curves away from the loading surface in a direction toward the back portion and the second convex surface curves away from the loading surface in the direction toward the back portion, and wherein the first convex surface extends over at least ten percent of a first displacement defined by the pad body from the first edge to the pad axis, and wherein the second convex surface extends over at least ten percent of a second displacement defined by the pad body from the second edge to the pad axis.

16. The torque pad of claim 15, wherein:

the pad face is configured to receive a first force in a first direction parallel to the pad axis from the backing plate, the pad body defines an additional edge configured to receive a second force in a second direction perpendicular to the first direction, the additional edge comprising one of a third edge or a fourth edge, the pad body is configured to transmit the second force from the additional edge to the boss when the back portion couples to the boss, and the pad face defines an additional convex surface extending from the loading surface toward the additional edge.

17. A method comprising:

engaging, by a loading surface of a pad face defined by a front portion of a pad body, a backing plate of a brake assembly, wherein the pad body defines a pad axis intersecting the loading surface and the pad face defines a convex surface extending from the loading surface to an edge of the pad body, wherein the edge is one of a first edge of the pad body or a second edge of the pad body, wherein the pad face extends from the first edge to the second edge and the pad axis extends between the first edge and the second edge, wherein the convex surface defines a surface profile on the pad face, wherein the surface profile extends from a point of commencement on the pad face to the edge, and wherein the convex surface defines a radius of curvature greater than a radius of curvature defined by a circular arc extending from the point of commencement to the edge; and coupling, using a back portion of the pad body opposite the front portion, the pad body to a boss of the brake assembly such that the pad axis intersects the boss.

18. The method of claim 17, further comprising transmitting, using a back face defined by the back portion, a force to the boss when the backing plate exerts the force on the loading surface.

* * * * *